United States Patent [19] [11] 3,852,519
Court [45] Dec. 3, 1974

[54] VIDEO AND AUDIO ENCODING/DECODING SYSTEM EMPLOYING SUPPRESSED CARRIER MODULATION

[75] Inventor: Patrick R. J. Court, Los Angeles, Calif.

[73] Assignee: Optical Systems Corporation, Los Angeles, Calif.

[22] Filed: Oct. 20, 1972

[21] Appl. No.: 299,436

[52] U.S. Cl. .......... 178/5.1, 178/DIG. 13, 325/138, 325/329
[51] Int. Cl. .......... H04n 1/44
[58] Field of Search ...... 178/5.1, DIG. 13; 325/138, 325/329

[56] References Cited

UNITED STATES PATENTS

| | | | |
|---|---|---|---|
| 3,081,376 | 3/1963 | Loughlin et al. | 178/5.1 |
| 3,184,537 | 5/1965 | Court et al. | 178/5.1 |
| 3,530,232 | 9/1970 | Reiter et al. | 178/5.1 |

*Primary Examiner*—Maynard R. Wilbur
*Assistant Examiner*—S. C. Buczinski
*Attorney, Agent, or Firm*—Lindenberg, Freilich, Wasserman, Rosen & Fernandez

[57] ABSTRACT

In a television transmission system, particularly a community antenna television system (CATV), although also applicable to broadcast television transmission, a system is disclosed for encoding both the video and audio components of a channel thus rendering the transmitted channel secure against unauthorized viewing and listening, by full or partial suppression of the video carrier such that the video modulation becomes inverted and the minimum 12.5% video carrier level required for intercarrier demodulation of the audio is lost. Sufficient information is transmitted within the encoded channel to permit a decoder at the receiver to produce a signal at the frequency of the suppressed video carrier, and of proper phase and amplitude, to restore the video carrier upon adding it to the suppressed video carrier.

32 Claims, 30 Drawing Figures

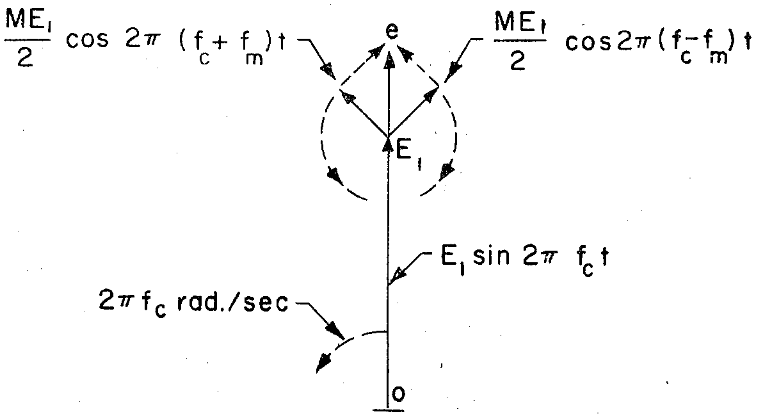
Fig. 1A
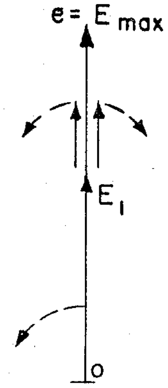
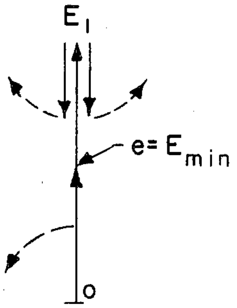
Fig. 1B Fig. 1C
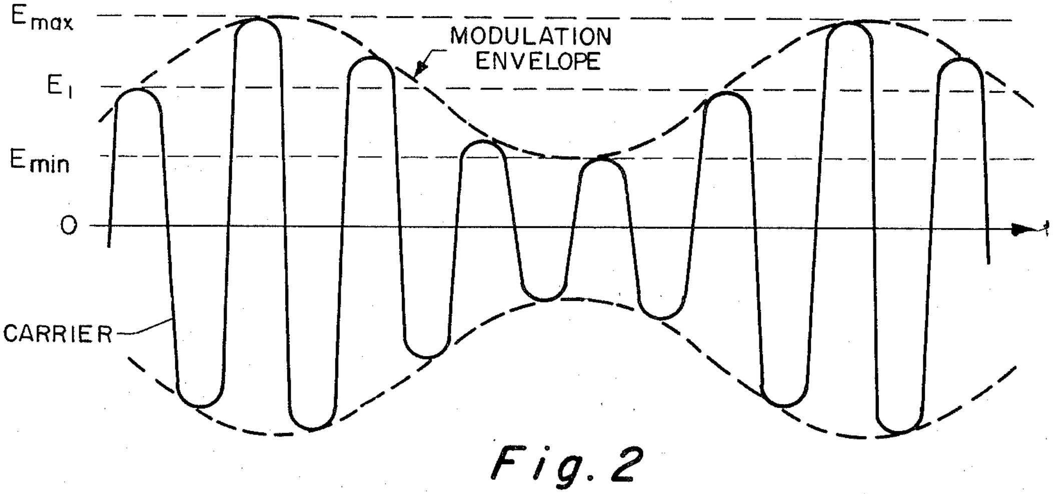
Fig. 2

CATV ENCODER MODULATOR

VIDEO AND AUDIO ENCODING/DECODING SYSTEM EMPLOYING SUPPRESSED CARRIER MODULATION

BACKGROUND OF THE INVENTION

This invention relates to television (TV) secrecy systems, and more particularly to an improvement therein.

With the advent of CATV. considerable thought has been given to distribution of programs other than those produced by the public broadcast stations, but only to subscribers of these special television programs, and not to all subscribers of the CATV distribution system. To accomplish that, it is desirable to process the signal being transmitted in such a way as to hide the video and/or the audio portion of the special television program from unauthorized television receivers connected to the CATV distribution system. Provision is then made at authorized receivers for restoring the hidden portion of the television program.

Numerous techniques for either video or audio encoding, or both, have been proposed in the past. However, where the number of subscribers authorized to receive these special programs is large, the cost of the decoder must be low, or the capital investment for the special program subscription will be inordinately high. Video encoding systems can be devised that require inexpensive decoding systems, but the decoding system should provide sufficient security so that it cannot be easily decoded. These two goals of low cost and high security are not easily achieved in the same system because greater security generally requires more complexity in the decoder, and increasing the complexity of the decoder obviously increases cost.

To encode the video portion of a TV program, a system has been described in U.S. Pat. No. 3,530,232 in which the sync and blanking signals of a composite video signal are reduced to the grey level. Restoration signals are generated, and are then encoded. For decoding, control code signals are also transmitted. At the receiver, the control code is used to decode the restoration signals which are then used to restore the sync and blanking portion of the composite video signal. Another technique for video encoding is described in U.S. Pat. No. 3,729,576 issued on an application Ser. No. 113,393 filed Feb. 8, 1971, by the present inventor involves modulating the video modulated carrier with a sinusoidal waveform to such a depth that the sync and video portions of the composite video signal are altered. Decoding is achieved by remodulating the encoded video waveform with a decoding sine wave 180° out of phase with the encoding sine wave. However, these techniques do not provide audio encoding. If the audio portion is to be encoded, some further provision must be made.

To encode the audio portion, a system has been described in U.S. Pat. No. 3,184,537 for transposing the audio carrier from its normal frequency position in the TV channel to a frequency such as 1 MHz below the video carrier. Then the audio cannot be reproduced by a standard TV receiver. However, due to the nature of CATV systems, where equal amplitude visual channels exist side by side with no guard band, this seemingly simple solution to encoding leads to complexities in decoding because the transposed audio carrier must be selected by a narrow band amplifier for the purpose of heterodyning it back to its normal IF frequency position. An alternative, and much improved audio encoding system which has been disclosed in patent application Ser. No. 184,474, filed Sept. 28, 1971, now U.S. Pat. No. 3,769,448, by the present inventor, is one in which the audio carrier is transmitted in its normal position in the channel, and the video carrier is moved to the opposite side of the channel, thus effectively inverting the video carrier in frequency. As a result of this shift of the video carrier to the upper end of the band, receivers relying on intercarrier modulation for producing the audio signal are unable to decode the audio. For decoding, a converter is provided to shift the video carrier back to its normal position at the site of the authorized receiver prior to feeding the program to the normal television receiver.

OBJECTS AND SUMMARY OF THE INVENTION

An object of this invention is to provide a television communication secrecy system for video, or video and audio, encoding which is simple and relatively inexpensive to implement.

This and other objects of the invention are achieved in a television transmission system wherein encoding of the video portion, or both the video and audio portions of a TV channel transmission, is achieved by suppression of the video carrier by a predetermined amount sufficient for the amplitude relationship between the sync and video levels to be modified, for the video modulation to become at least partially inverted, and in the case of encoding both the video and audio portions, for the minimum 12.5% video carrier level required for intercarrier demodulation of the audio to be lost. Sufficient information is transmitted for restoring the video carrier by an authorized receiver. In one embodiment, a reference carrier and a reference subcarrier are transmitted with the suppressed video carrier for that purpose. The reference subcarrier is a low frequency (125KHz) signal amplitude modulated on the FM audio carrier and the reference carrier is at a frequency equal to the difference between the video carrier and the product of the reference subcarrier multiplied by a constant (8) for a predetermined intercarrier difference (1 MHz) between the video carrier and the reference carrier. Restoration of the suppressed video carrier in a converter/decoder is achieved by an exactly inverse process which relys on the interdependence in phase and frequency between the intercarrier difference signal and the reference subcarrier to produce a signal at the frequency of the suppressed video carrier, and of proper phase and amplitude, to add to the suppressed video carrier to restore it. If the video carrier has been suppressed by 12.5% or more, the audio portion of the channel is encoded. In another embodiment employing 75% suppression of the video carrier, keying pulses synchronized (in phase and width) with horizontal sync pulses in the video carrier are amplitude modulated on the FM audio carrier. The converter/decoder detects the keying pulses and in response to each keying pulse, gates the video carrier present during the horizontal sync pulse interval. Each gated burst of video carrier is used to synchronize a local oscillator employed to produce a signal at the frequency of the suppressed video carrier, and of proper phase and amplitude necessary to restore the video carrier, thereby decoding the video and audio portions of the TV signal.

BRIEF DESCRIPTION OF THE DRAWINGS

FIGS. 1A, 1B and 1C show vector diagrams of normal amplitude modulation of a sinusoidal carrier with a sinusoidal signal.

FIG. 2 is a waveform diagram of the composite wave vectorially illustrated in FIGS. 1A–1C.

FIG. 6A depicts a carrier wave modulated in accordance with NTSC standards while

DESCRIPTION OF THE PREFERRED EMBODIMENTS

Figure 3A:
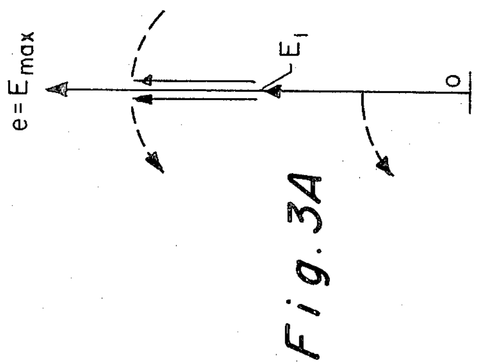
FIGS. 3A, 3B and 3C show vector diagrams and a waveform diagram of amplitude modulation in which the carrier is partially suppressed.

As noted hereinbefore, this invention relates to a system for encoding both the video and audio components of a television channel, that effectively destroys the entertainment value of these video and audio components and thus renders them secure against unauthorized viewing. The encoding system described herein is particularly applicable to CATV systems; however, it is also applicable to broadcast television transmissions.

Unlike most other encoding/decoding systems previously known, wherein separate means are required for encoding the amplitude modulated video and the frequency modulated audio, the system disclosed herein uses a single means at the transmitter for encoding both video and audio. Likewise, at an authorized subscriber decoder, a single means is used for decoding the video and audio components of the transmitted program, thereby restoring their entertainment value when the program is reproduced through a standard television receiver.

The degree of security obtained through the described encoding system is very high, yet the apparatus required at the authorized subscriber locations is relatively simple and inexpensive. It is, however, beyond the skill of the vast majority of unauathorized viewers to duplicate the equipment required for decoding, so that "pilfering" of the encoded transmissions through such clandestine means is not a matter of concern to the operator who furnishes these transmissions to authorized viewers.

In addition to the desirable characteristics of inherent security and relatively low cost in the decoding equipment, which has to be furnished in large quantities, the system herein described also satisfies a number of other requirements which are essential to successful commercial operation.

1. There is no perceptible degradation of the encoded and decoded picture and sound in comparison with those received from a standard transmission. In particular, the decoding process avoids the necessity of demodulating either video and audio to baseband and of subsequent remodulation, with the inherent degradation of quality which is consequent thereto.
2. All of the signals, including the decoding signals, pertaining to the encoded transmission, are contained within the standard 6 MHz channel bandwidth. This avoids the possibility of interfering with adjacent channels on a CATV system, or with adjacent over-the-air channels in a broadcast situation.
3. The decoder for decoding the received encoded transmissions functions as an attachment to a subscriber television receiver and delivers a standard television channel to the antenna terminals of this receiver.
4. The decoder may be rendered as a plug-in attachment to a subscriber converter. Subscriber converters are now commonly used in CATV systems to increase channel capacity and to overcome direct pickup problems. U.S. Pat. No. 3,333,198 describes a typical subscriber converter for overcoming direct pickup. Similar converters, including additional means for tuning non-standard CATV channels, are now in common use.
5. The decoder, or the converter/decoder of which it may form a part, can be such that standard transmissions are passed to the subscriber television receiver unaltered in any way.

The encoding process, which is the subject of the present invention, involves suppression, or partial suppression, of the video carrier. This has three effects upon the transmitted video, the first being that it modifies the amplitude relationship between the sync and video levels. The second is that the polarity of the video modulation becomes inverted, i.e., negative instead of positive. The third is that the minimum 12.5% carrier level required for intercarrier demodulation of the audio is lost. These effects and their consequences will be examined in much greater detail after first examining the fundamental nature of suppressed carrier amplitude modulation. For simplicity, first consider normal amplitude modulation of a sinusoidal carrier wave $E_1 \sin 2\pi f_c t$ with a sinusoidal voltage $E_2 \sin 2\pi f_m t$. The techniques for accomplishing this are of course very well known in the art, as is the general expression for the resultant amplitude modulated signal:

$$e = E_1 \sin 2\pi f_c t + (ME_1/2) \cos 2\pi(f_c - f_m)t - (ME_1/2) \cos 2\pi(f_c + f_m)t \quad (1)$$

where $M$ is the degree of modulation and is equal to $E_1/E_2$. The first component in this equation represents the carrier, while the second and third components are the lower and upper sidebands, respectively.

The composite signal expressed in equation 1 may be represented in the form of a vector diagram in FIG. 1A which shows the carrier vector $E_1 \sin 2\pi f_c t$ rotating at an angular velocity of $2\pi f_c$ radians/second and with a magnitude of $E_1$. Associated with the carrier vector are the two oppositely rotating sideband vectors, $(ME_1/2) \cos 2\pi(f_c + f_m)t$ and $(ME_1/2) \cos 2\pi(f_c - f_m)t$. Their angular velocities differ from that of the carrier vector by $+\cos 2\pi f_m$ and $-\cos 2\pi f_m$, respectively, where $f_m$ is the modulation frequency. The magnitude of each of these sideband vectors is $ME_1/2$. The resultant of these three vectors occurs at $e$, which gives the instantaneous magnitude of the composite wave.

In FIG. 1B, all three vectors are instantaneously exactly in phase, yielding the maximum value of $e$, while in FIG. 1C, the two sideband vectors are instantaneously in exact antiphase with the carrier vector, yielding the minimum value of $e$. In this example shown, M, the degree of modulation which is also defined as (Emax − Emin/2), is 0.5. In this case, the magnitude of each of the two sideband vectors is 25% that of the carrier vector and Emin is 50% of $E_1$.

From FIG. 2, which shows a waveform diagram of the composite wave vectorially illustrated in FIGS. 1A–1C, the carrier amplitude is seen to vary from Emax to Emin, with an average amplitude of $E_1$, as a result of the modulation. If the value of M is chosen as 1.0 then the two sideband vectors would each have a magnitude of 50% of the carrier vector and the carrier would have a magnitude of zero at Emin and $2E_1$ at Emax. It will be noted from both the vector diagrams and the waveform diagram that the phase of the carrier is unaffected by the modulation. It should also be noted that no DC component is present. This modulation process is typical of normal AC coupled modulation.

Figure 3B:
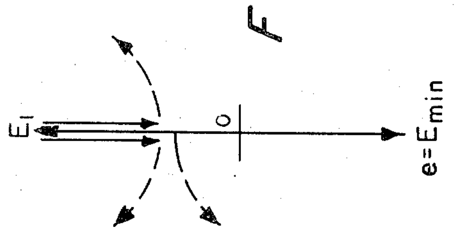
Figure 3C:
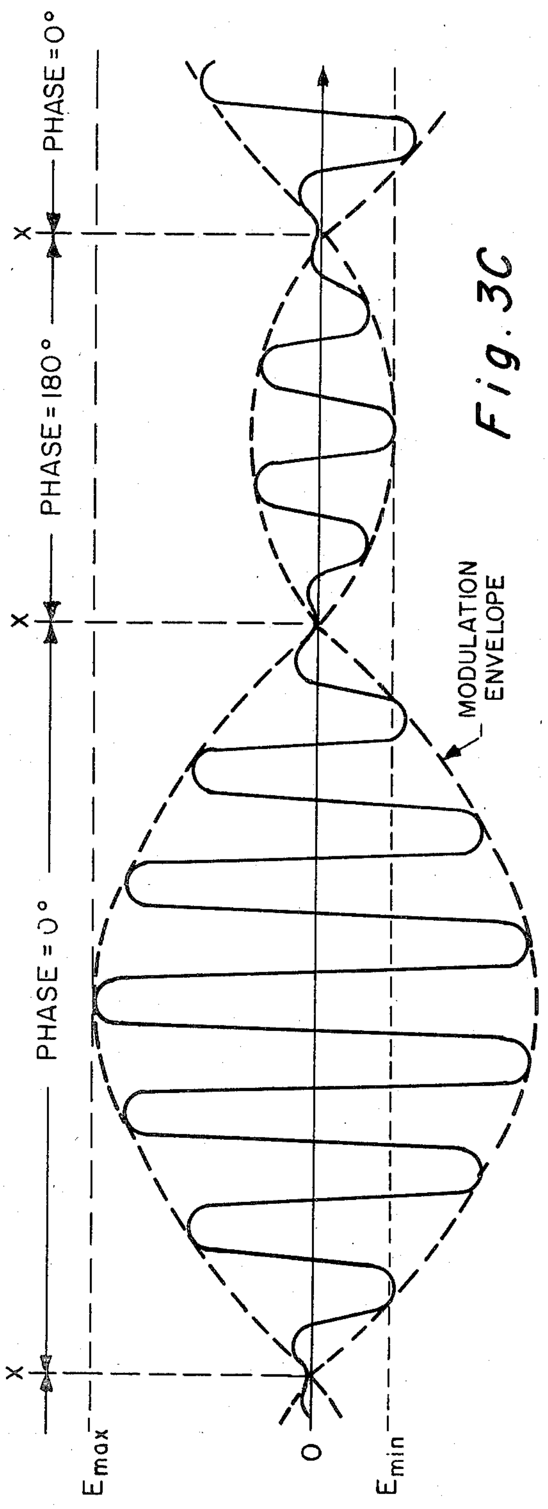

An example of amplitude modulation in which the carrier is partially suppressed will now be described. FIGS. 3A and 3B are vector diagrams in which the carrier vector amplitude $E_1$ has been reduced or suppressed to an amplitude less than that of the maximum resultant of the two sideband vectors, while FIG. 3C depicts the resultant waveform diagram. It will be noted from FIG. 3B that when the two sideband vectors are in exact phase opposition to the carrier vector, the resultant vector has a minimum amplitude, Emin, which is negative with respect to the maximum amplitude, Emax, shown in FIG. 3A. The phase of the resultant vector Emin is thus in opposition to the phase of the resultant vector Emax. If we define the phase of Emax as 0°, then the phase of Emin is therefore 180°. This is clearly seen in the waveform diagram shown in FIG. 3C. The phase of the carrier reverses at each of the points $x$ where the modulation envelope crosses the zero reference.

Figure 4A:
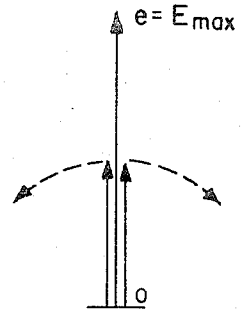
FIGS. 4A, 4B and 4C show vector diagrams and a waveform diagram of amplitude modulation in which the carrier is completely suppressed.
Figure 4B:
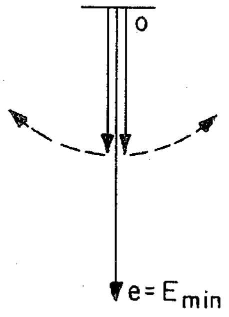
Figure 4C:
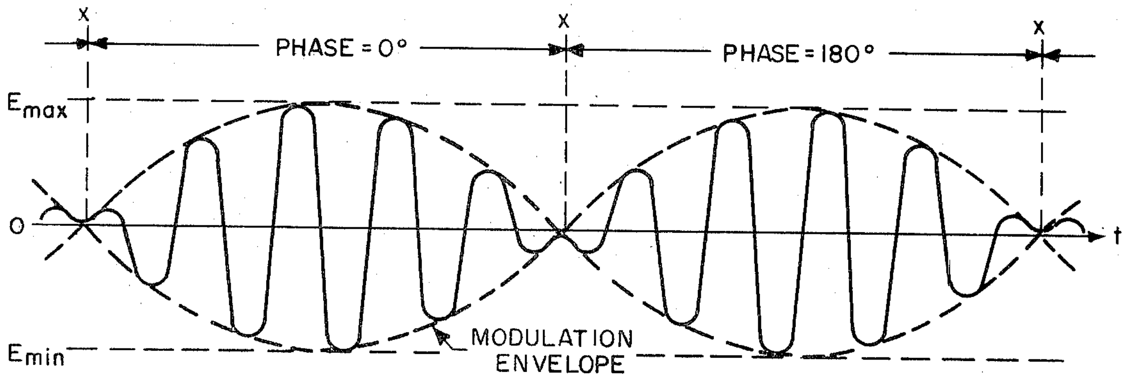

FIGS. 4A, 4B and 4C illustrate the case of amplitude modulation in which the carrier is 100% suppressed. From FIGS. 4A and 4B it is seen that the two oppositely rotating sideband vectors result in equal and opposite values of Emax and Emin. The waveform diagram of FIG. 4C shows that a 180° phase reversal of the carrier occurs at points $x$ where the modulation envelope crosses the zero reference.

Figure 5:
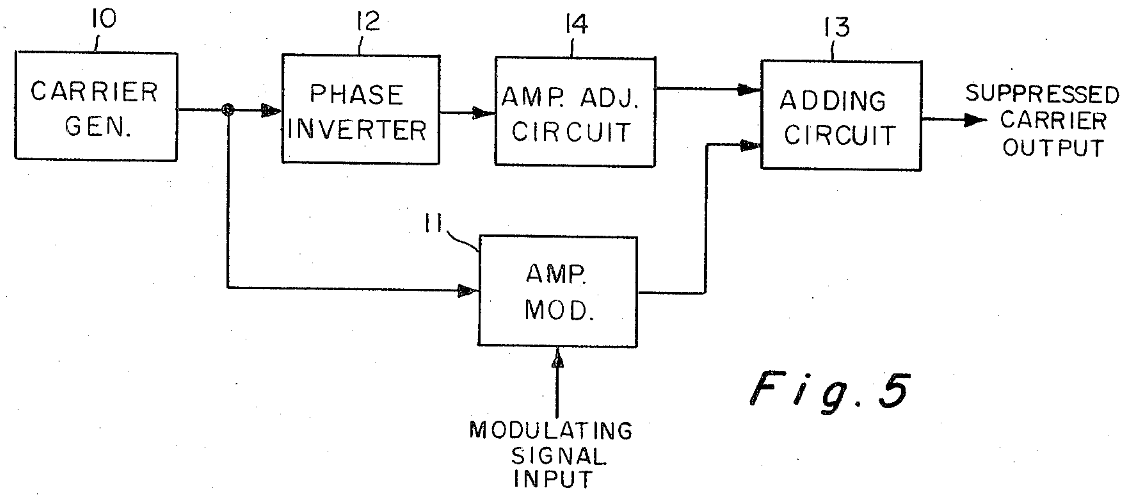
FIG. 5 illustrates in a block diagram a technique for achieving suppressed carrier modulation.

The techniques for achieving completely suppressed or partially suppressed carrier modulation are well known in the art. Completely suppressed carrier modulation may, for example, be achieved by the use of balanced modulators of the type illustrated in "Radio Engineers Handbook" by F. E. Terman, Page 557 (McGraw Hill). Completely and partially suppressed carrier modulation may also be achieved by using the technique of adding a sinusoidal, constant amplitude signal of exactly the same frequency and in exact phase opposition to the carrier component at the output of a conventional amplitude modulator circuit. Such an arrangement is illustrated in FIG. 5, wherein a carrier generator 10 drives both an amplitude modulator 11 and a phase inverter 12. A second input to the amplitude modulator is the modulating signal and the output of the modulator is a conventional amplitude modulated signal. This is passed to an adding circuit 13. The second input to the adding circuit is the output of an amplitude adjusting circuit 14 which allows relative adjustment of the phase-inverted carrier output received from the carrier generator via the phase inverter. Through the adjustment of circuit 14, a signal in phase opposition to the carrier component output of modulator 11 may be varied so as to partially or totally cancel this carrier component in the adding circuit. Thus the degree of suppression of the amplitude modulated carrier transmitted may be readily controlled to fulfill either of the conditions illustrated in FIGS. 3A–3C and 4A–4C.

The suppressed carrier technique illustrated in FIG. 5 is particularly applicable to means for encoding both the video and audio components of a television transmission, as will now be described with reference to FIGS. 6A–6D, and the corresponding FIGS. 7A–7D.

Figure 6A:
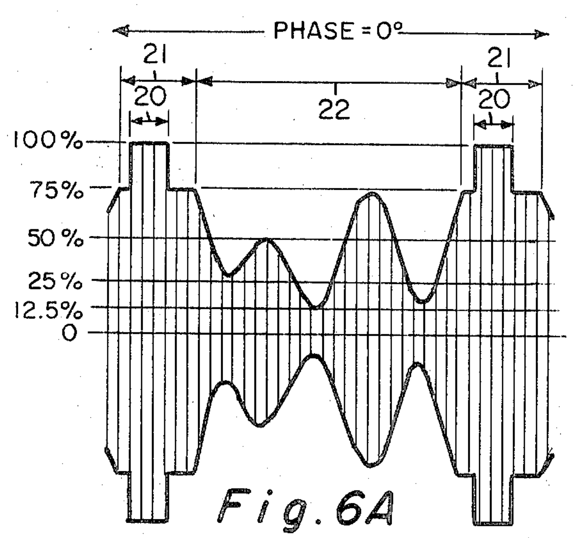

FIG. 6A depicts a carrier wave, modulated in accordance with NTSC standards, with a portion of a video waveform corresponding to one horizontal line. For simplicity, the color reference and subcarrier signals are omitted. The sync portion 20 of the video envelope is shown to have its normal peak value of 100% carrier, while the blanking portion 21 has its level at 75%. The video intelligence period 22 has an excursion between 75% of peak carrier which corresponds to the black portions of a televised scene, and 12.5% of peak carrier which corresponds to the whitest portions of the scene. NTSC standards provide for peak white at 12.5% carrier level in order to allow for satisfactory inter-carrier demodulation of the frequency modulated audio carrier which is spaced 4.5 MHz from the video carrier.

As noted hereinbefore with reference to FIG. 2, the video carrier wave has a constant frequency and phase and, for future reference herein, this phase is arbitrarily defined as 0°. Because of the very high frequency of the television carrier wave, its sinusoidal nature is not shown either in FIG. 6A or in the related FIGS. 6B, 6C and 6D. Instead, the sinusoidal nature is represented by vertical lines. However, it will be understood by reference to the previously discussed FIGS. 2, 3C and 4C.

Figure 7A:
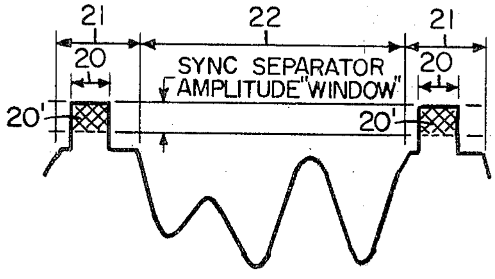
FIGS. 7A, 7B, 7C and 7D depict the video waveforms that would be recovered by a video detector in a normal television receiver when demodulating the modulated video carrier of respective FIGS. 6A, 6B, 6C and 6D.

FIG. 7A depicts the video waveform that would be recovered by the video detector in a normal television receiver, when demodulating the standard modulated video carrier, illustrated in FIG. 6A. In such a receiver, the sync portion 20 of this waveform is separated from the video intelligence by means of a restoring-type amplitude separator which conducts current only in response to those portions of the waveform which appear in its "amplitude window", shown in FIG. 7A. In this instance only the sync pulses can cause current conduction. The corresponding sync current pulse 20' are shaded in FIG. 7A.

Figure 6B:
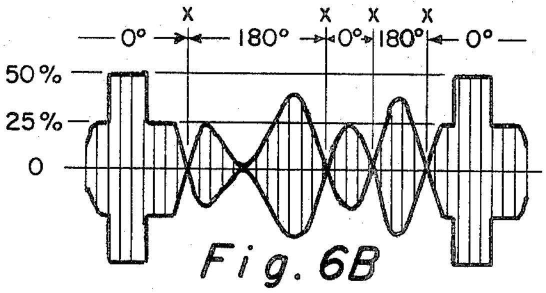
FIGS. 6B,6C and 6D illustrate the same video information with the carrier suppressed 50%, 75% and 100% respectively.

FIG. 6B illustrates a carrier wave, modulated with the identical video waveform depicted in FIG. 6A, but with the carrier voltage suppressed 50%. The peak sync level during the period 20 has been reduced from its normal level of 100% to 50%. The blanking and black level has also been reduced from its normal 75% plateau to 25%. In addition, the video intelligence envelope is depressed so that it crosses the zero carrier reference line, in a manner corresponding to that discussed in connection with FIGS. 3C and 4C, with accompanying phase reversals of the carrier at each of the points $x$ indicated. Such phase reversal occurs at each point where the video intelligence envelope crosses the zero references line.

Figure 7B:
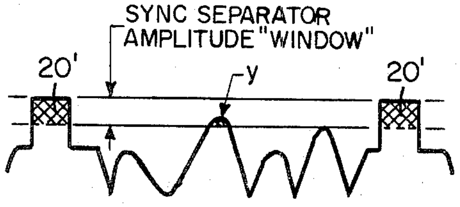

As the video intelligence envelope intersects the zero reference line, portions of the positive envelope extend into the negative region and vice versa. The result is that the detected video waveform that would be recovered by the video detector in a normal television receiver would contain both positive and negative going components of the video intelligence envelope, as illustrated in FIG. 7B. The effect is a partial scrambling of the video intelligence because of the intermixing of portions of the video waveform with correct polarity with others of opposite, incorrect polarity.

In examining FIG. 7B, it will be noted that while the video intelligence waveform is severely distorted in comparison with that shown in FIG. 7A, the sync portions still remain the most predominant feature from the standpoint of relative amplitude. A normal sync separator would therefore tend to conduct current only during the sync intervals which fully intercept the amplitude window of the sync separator, yielding the current pulses 20' which are shaded as in FIG. 7B. In the example illustrated the only minor incursion of the video intelligence waveform into this window is at point y in FIG. 7B. In general, therefore the suppression of the carrier voltage by a factor of 50% is not sufficient to unduly disturb proper synchronization.

Figure 6C:
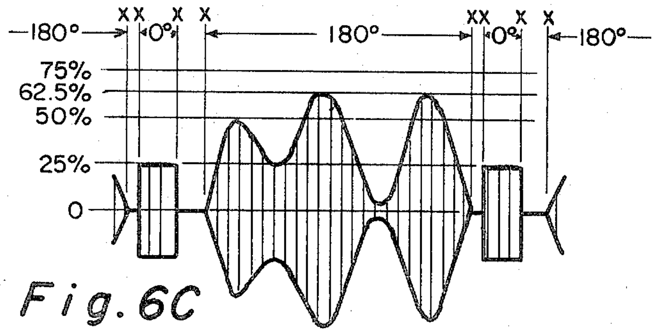

FIG. 6C illustrates the condition where the video carrier has been suppressed by a factor of 75%. In this instance the carrier voltage existing during the peak sync intervals 20 has been reduced from its normal 100% level to only 25%, reflecting the 75% suppression factor. The carrier voltage during the horizontal blanking intervals 21 has reduced to zero in this particular case, except of course during the sync portions 20, representing total cancellation of its normal 75% level. It will also be noted that the positive and negative modulation envelopes have become completely interchanged, with reference to their normal disposition as illustrated in FIG. 6A, accompanied by complete phase reversal of the carrier signal between the individual points $x$ in FIG. 6C. Thus the carrier phase during the sync intervals is still 0°, the arbitrarily specified reference, while its phase during the video intelligence period 22 is 180°. During the blanking intervals 21 no carrier exists at all except again during the sync portions 20, and so it obviously has no phase.

Figure 7C:
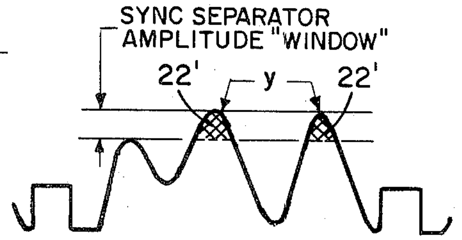

Now referring to the corresponding FIG. 7C, depicting the video signal that a normal television receiver detector would recover from the 75% suppressed, amplitude modulated video carrier shown in FIG. 6C, it will be noted that a very interesting situation exists. First, the recovered video intelligence signal has experienced a total reversal of polarity with respect to the normal situation depicted in FIG. 7A. Even assuming that a television receiver could synchronize correctly with such a signal, which will be shortly shown to be impossible, the resultant image reproduced on the screen would be negative (i.e., white information in the scene would be reproduced as black and vice versa). Second, the amplitude excursion of the video intelligence waveform, which of course constantly varies with the changing content of the televised scene, is substantially greater than that of the synchronizing pulses. In the typical example shown, the video intelligence has a peak value of more than twice that of the synchronizing pulses.

A normal television sync separator will "restore" on the most positive peaks of the waveform, noted at points $y$ in FIG. 7C, and current conduction will occur only during the shaded portions 22' of the envelope which intercept the amplitude window of the sync separator. The synchronizing pulses during intervals 20 are depressed far below this amplitude window, and cause no current conduction in the sync separator, so no synchronizing information is available to the vertical and horizontal sweep circuits of the receiver. Instead these circuits receive totally false and time-varying information derived from the video intelligence envelope with the result that the reproduced picture is completely jumbled, in addition to having a negative polarity. The resultant image has absolutely no entertainment value and the scrambling effect resulting from such a form of video encoding meets the criterion of security as was defined previously.

Figure 6D:
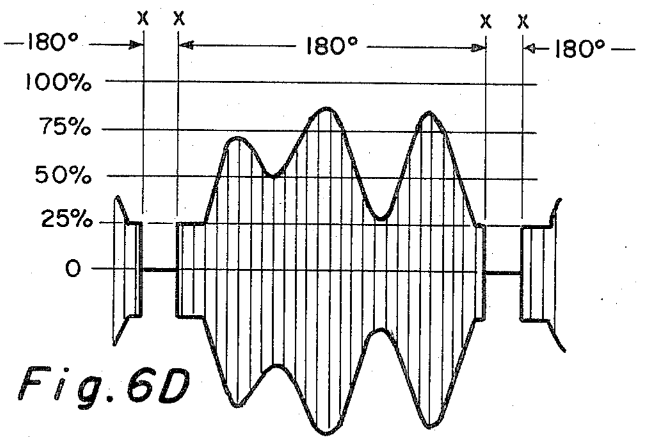
Figure 7D:
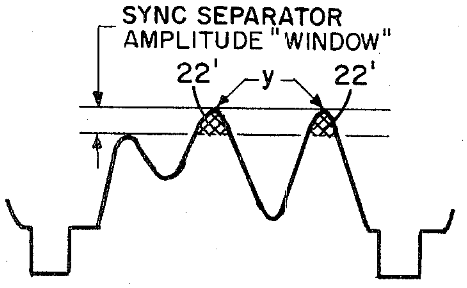

It will be shown that audio encoding is also accomplished through the process of suppressing the video carrier but first attention is drawn to FIGS. 6D and 7D which illustrate the case of full (100%) suppression of the video carrier. Full suppression of the video carrier causes its level, during the peak sync intervals 20, to reduce from its normal 100% value to zero. In addition, the full suppression case is unique in that the positive and negative envelopes of the entire waveform, including video and sync, are interchanged. This is clearly seen from a comparison of FIGS. 6A and 6D, and of the corresponding FIGS. 7A and 7D. In addition, no carrier exists at its original phase reference of 0°. No carrier exists during the sync intervals and, for the balance of the waveform, it has a phase of 180°.

The encoding or scrambling of the reproduced picture, resulting from the full suppressed carrier transmission illustrated in FIG. 6D is equally as effective as that resulting from the transmission illustrated in FIG. 6C. Referring to the detected video waveform depicted in FIG. 7D it will be noted that only the peaks of the inverted video intelligence envelope can cause current conduction in a normal restoring-type amplitude separator, such as is used in standard television receivers for sync separation, as indicated at points *y*. This, combined with the negative video intelligence envelope, results in a completely jumbled or scrambled negative image almost identical to that resulting from the transmission illustrated in FIGS. 6C and 7C.

Thus, the use of both 75% and 100% video carrier suppression in a television transmission are equally efficacious as methods of encoding the video intelligence, as they result in complete scrambling of the picture and consequent destruction of its entertainment value. Both cases are unique in that the video carrier always has zero amplitude for part of the time. In the case of 75% carrier suppression the video carrier always has zero amplitude during the blanking portions of intervals 21, as illustrated in FIG. 6C. In the case of 100% carrier suppression, it always has zero amplitude during the sync intervals 20. This total loss of video carrier for part of the time is utilized in this invention as an effective means for encoding the audio, as will now be described.

Figures 8A, 8C, 8D:
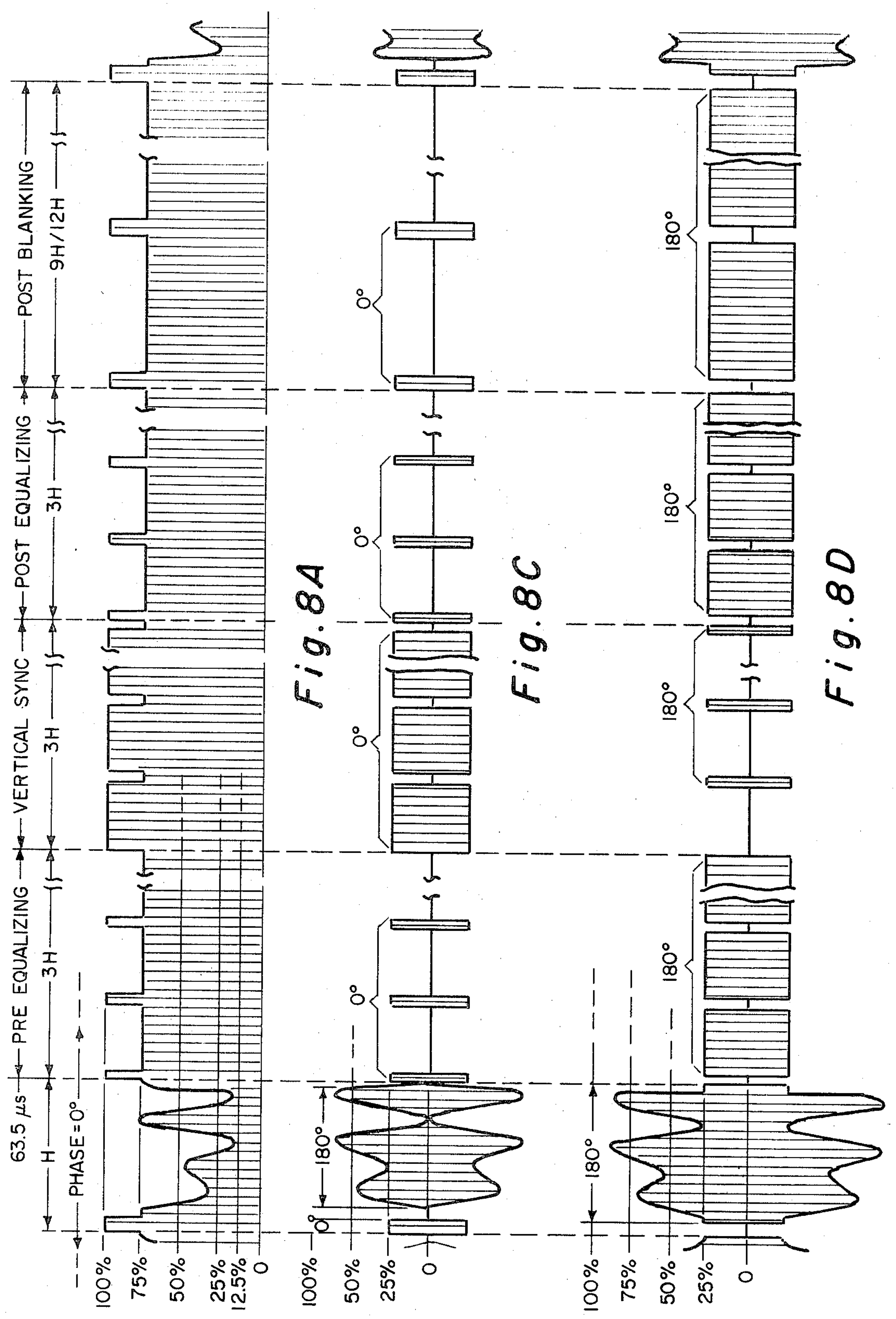
FIGS. 8A, 8C and 8D (there being no FIG. 8B) illustrate the vertical sync and blanking portions of a television waveform with normal modulation, 75% carrier suppression and 100% carrier suppression, respectively, to demonstrate how audio encoding is achieved in addition to video encoding.

The various degrees of carrier suppression that have been discussed were illustrated by the use of diagrams relating only to a horizontal portion of the video waveform. Attention is now directed to FIGS. 8A, 8C and 8D which relate to the vertical sync and blanking portions of the waveform, and which correspond to the respective conditions illustrated in FIGS. 6A, 6C and 6D of normal transmission, transmission with 75% carrier suppression and transmission with 100% carrier suppression, respectively.

FIG. 8A shows the envelope of a carrier wave, modulated with normal video, as it appears during the vertical retrace interval. Since the modulated carrier wave is symmetrical, only the positive half is shown in FIG. 8A. This comprises the 3H pre-equalizing interval, the 3H vertical sync interval, the 3H post-equalizing interval and the post-blanking interval which may vary between 9H and 12H. For clarity, not all of the pulses and serrations in these intervals are shown. Shown also in FIG. 8A is the last horizontal line preceding the vertical interval and a portion of the first horizontal line following the vertical interval. The phase of the carrier wave remains unchanged at 0° throughout the vertical interval and at no time does the carrier voltage reduce to zero. The peaks of all the pulses and serrations are at 100% carrier which is the same as for the horizontal sync intervals 20 depicted in the corresponding FIG. 6A.

FIG. 8C depicts the modulated carrier envelope during the vertical interval when the carrier is suppressed 75%. As in the corresponding FIG. 6C, the peak sync portions of the wave are reduced by 75%, i.e., from 100% to 25% and those portions of the wave corresponding to black level or blanking level are reduced from 75% to zero. The positive and negative video modulation envelopes of the preceding horizontal line are also interchanged, as was discussed with reference to FIG. 6C, together with a reversal of the carrier phase from 0° to 180°.

Of particular interest in FIG. 8C is the fact that for a substantial portion of the vertical retrace interval, the carrier has zero amplitude. This particularly applies to the pre-equalizing and post-equalizing intervals and the post-blanking interval. Considering the vertical retrace interval as a whole, the carrier is at zero for approximately 75% of the entire period of 18 to 21 H, and this situation occurs 60 times per second, the vertical sync repetition frequency.

All normal television receivers employ intercarrier detection of the frequency modulated audio carrier. This process usually occurs in the video detector, from which a 4.5 MHz difference frequency is obtained, corresponding to the frequency separation of the video and audio carriers. To allow satisfactory intercarrier detection, FCC standards require that the minimum value of the transmitted video carrier, corresponding to peak white, is not less than 12.5% of its peak value. This, together with appropriate attenuation of the audio carrier in the receiver, prior to intercarrier detection, ensures that the audio carrier always has a lesser value at the video detector than the video carrier. A 4.5 MHz FM carrier is thus recovered from the video detector which has virtually constant amplitude and which may be demodulated in the discriminator for purposes of reproducing the audio intelligence.

If a normal television receiver receives a video carrier corresponding to that illustrated in FIGS. 6C and 8C, together with the accompanying frequency modulated audio carrier, the reproduced audio is disturbed by an extremely loud 60 Hz buzz. This results from the absence of video carrier during the 60 Hz vertical retrace intervals which in turn causes a 60 Hz chopping of the 4.5 MHz FM carrier recovered from the video detector. When the video carrier disappears entirely, the difference frequency also disappears. The resultant chopping of the reproduced audio at a 60 Hz rate is of sufficient magnitude that the entertainment value of the audio is destroyed. Thus the suppression of the video carrier by 75% results not only in extremely efficient encoding or scrambling of the picture but in effective encoding or scrambling of the audio as well.

FIG. 8D illustrates the effect of 100% carrier suppression upon the vertical interval and corresponds to the situation shown in FIG. 6D and previously discussed with respect to a single horizontal period. In this case, as before, the peak sync portions of the wave are reduced from 100% to zero, and the positive and negative envelopes are entirely interchanged. Of interest is the fact that the carrier has zero amplitude during most of the 3H vertical sync interval, and during the sync and equalizing pulse periods of the equalizing intervals. The fact that it is also zero during the sync periods of the post-blanking interval is of no consequence in this case, because these pulses occur at a 15.75 KHz rate as they do during the horizontal periods. The chopping of the video carrier, particularly during the vertical sync interval, results in a 60 Hz buzz in the reproduced audio, however, it is not as disturbing as is the case when the carrier is suppressed 75%. This is because the carrier has zero value for only about 20% of the vertical retrace interval compared with about 75% of the vertical retrace interval with 75% carrier suppression. Consequently, while 100% carrier suppression results in equally efficient video encoding, the audio encoding is not as effective as with 75% carrier suppression.

It should be noted, in connection with FIGS. 6C and 8C, that the degree of this audio encoding can become enhanced beyond that provided by the buzz due to the absence of carrier during the vertical retrace intervals. This will occur during the video intelligence intervals whenever there is some black content in the scene being televised. As black level has the same normal 75% carrier level as does the horizontal and vertical blanking intervals, those portions of the scene corresponding to black will reduce to zero carrier. As these black level scene portions of the video intelligence will have a strong 60 Hz component, the audible buzz will become greatly enhanced beyond the minimum level provided by the vertical blanking components. Consequently, 75% carrier suppression yields audio encoding with a strong minimum buzz component which becomes even more disturbing due to the variations in the content of the televised scene.

With reference to FIGS. 6D and 8D, which illustrate 100% carrier suppression, it will be noted by comparison that the time varying video components cannot reduce the carrier to zero. Variations in the televised scene, therefore, cannot enhance the loudness of the minimum 60 Hz buzz provided by the vertical sync components. Therefore, from the standpoint of the annoyance factor of the audio encoding, as a function of the video intelligence waveform, 75% carrier suppression is again preferred.

In passing, it should be noted that degrees of carrier suppression between 75% and 100%, while efficacious for video encoding, do not yield satisfactory audio encoding at all. As an example, 87.5% carrier suppression yields a carrier level of 12.5% during both the sync and blanking intervals and a minimum carrier level of 12.5% during the video intelligence intervals. 12.5% minimum carrier is the level specified in the NTSC standards to provide satisfactory intercarrier audio detection and so 87.5%% carrier suppression is self-defeating as a means of encoding audio.

It should also be noted in passing that some degree of audio encoding will occur when less than 75% carrier suppression is employed. Referring to the case of 50% suppression illustrated in FIG. 6B, it will be seen that the carrier can have zero amplitude from time to time as a result of the excursions of the video intelligence portion 22 of the waveform in the vicinity of the zero reference. However, there is no audio encoding provided by the existence of zero carrier during the vertical sync intervals. It was also noted previously that carrier suppression by 50% is not really completely satisfactory for video encoding.

It is evident from the preceding discussion that varying degrees of both video and audio encoding are provided with different percentages of video carrier suppression and, while the level of 75% is evidently preferred (particularly with the current U.S. television standards), it should not be construed as a rigid limitation. Audio encoding sets in at 12½% suppression and increases to a maximum at 75% suppression then decreases to 87½% suppression where there is no audio encoding. As the degree of suppression is further increased from 87½%, audio encoding again sets in. As to video encoding, it is apparent that as suppression is increased above 12½% to about 50%, there will be some increase in the reversal of black to white and white to black due to phase inversio. Further increase in the degree of suppression will introduce sync disturbance, and in the range of 75% to 100% suppression, the picture will be completely scrambled, in addition to a complete reversal of black and white due to complete phase reversal.

The methods and means for encoding television transmission through suppression of the video carrier, and for reliably and economically decoding the received transmission at an authorized subscribed location will now be described. In fact two different systems of encoding and decoding will be described.

Figure 9:
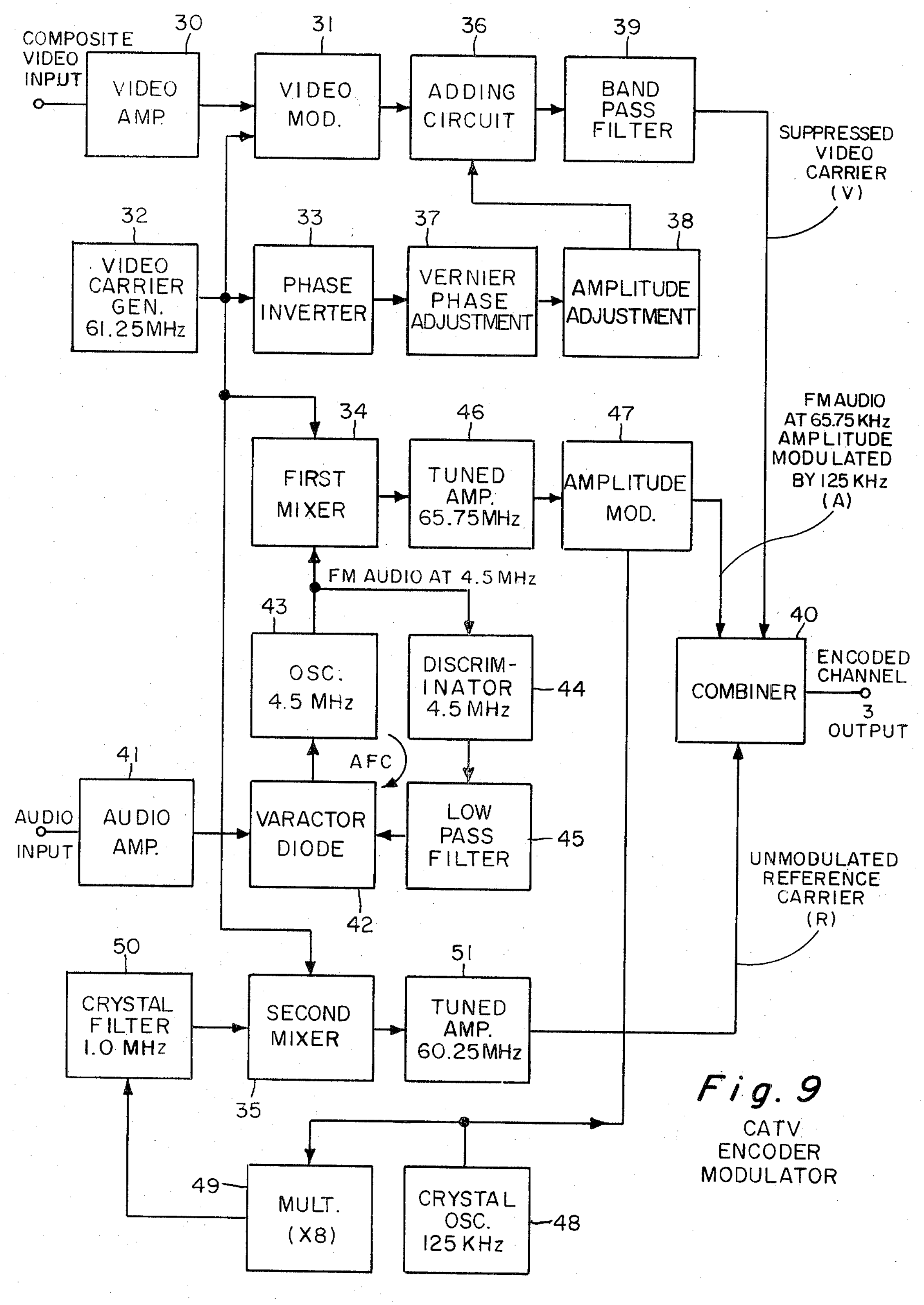
FIG. 9 is a block diagram of an encoder/modulator suitable for transmission over a CATV system in accordance with this invention.

Attention is now directed to FIG. 9 which is a block diagram of an encoder/modulator for generating an encoded television channel, suitable for transmission over a CATV system in accordance with this invention. For convenience, the channel frequency generated by the encoder/modulator of FIG. 9 is assumed to be channel 3, although the techniques are applicable to any channel that may be carried by a CATV system. The video frequency of channel 3 is 61.25 Mhz, while the audio frequency is 65.75 MHz.

The video signal obtained from the originating studio is applied to a video amplifier 30 and passed to a video modulator 31 as a first input. The second input to the modulator is the output from a video carrier generator 32. The generator is a crystal-controlled oscillator operating at 61.25 MHz. It also provides outputs to a phase inverter 33, a first mixer 34 and a second mixer 35. The output of modulator 31 is a normal amplitude modulated video carrier as depicted in FIGS. 6A and 8A. The phase inverter 33 inverts the phase of the steady carrier output from the generator. The inverted carrier is passed to an adding circuit 36 through a vernier phase adjusting circuit 37 and an amplitude adjusting circuit 38. A second input to the adding circuit is the video modulated carrier output from the video modulator. The adding circuit may be simply a resistive matrix network. By appropriate adjustment of circuits 37 and 38, the steady carrier input to the adding circuit is caused to have an amplitude exactly 75% of the peak sync carrier input from the video modulator, and to have a phase which is in exact opposition to the modulated carrier phase. The output from the adding circuit will then comprise a 75% suppressed video-modulated carrier as particularly illustrated in FIGS. 6C and 8C.

The suppressed video carrier output from the adding circuit is applied to a band pass filter 39 which provides vestigial sideband suppression and shaping of the color subcarrier sidebands. The output of filter is applied as a first input to a combiner 40.

The audio input from the originating studio is applied to an audio amplifier 41 which drives a varactor diode 42 operating as a variable capacitor to vary the frequency of a 4.5 MHz oscillator 43 in sympathy with the audio voltage output from amplifier 41. The output from oscillator 43 is thus a 4.5 MHz frequency-modulated audio carrier. It is applied both to the first mixer 34 as a second input, and to a 4.5 MHz discriminator 44. The discriminator develops a DC voltage which varies as the center frequency of the oscillator 43. The output of the discriminator is filtered in a low pass filter 45 to remove any AC components. The filtered DC output is applied as a second input to the varactor diode 42. The discriminator 44, filter 45 and diode 42 thus serve as an AFC loop to preserve the center frequency accuracy of the frequency modulated 4.5 MHz oscillator 43.

In first mixer 34, both the sum and difference frequencies of the 61.25 MHz and 4.5 MHz inputs are developed. Only the sum frequency of 65.75 MHz is of interest which is a frequency modulated audio carrier suitable for channel 3 and this is selected and amplified in a tuned amplifier 46. The output from the tuned amplifier 46 is applied as a first input to an amplitude modulator 47.

A highly stable 125 KHz crystal oscillator 48 provides two outputs, one of which forms an input to a multiplier circuit 49 which multiplies by eight yielding a frequency of 1.0 MHz. this frequency is selected by a 1.0 MHz crystal filter 50 and applied as a second input to the second mixer 35. The first input to that mixer, it will be recalled, is an output from the video carrier generator at 61.25 MHz.

The second mixer 35 develops both the sum and difference of its two inputs, but only the difference is of interest. This difference is 60.25 MHz and is selected for amplification by a tuned amplifier 51 before it is applied as a second input to the combiner 40. This 60.25 MHz carrier will hereinafter be referred to as the "reference carrier".

The second output of the 125 KHz crystal oscillator 48 is applied as a second input to the amplitude modulator 47. It will be recalled that the first input to the amplitude modulator is the frequency modulated audio carrier at 65.75 MHz. The output of modulator is thus a 65.75 MHz carrier, both frequency modulated with audio and amplitude modulated with a 125 KHz sine wave. This compositely modulated signal is applied as a third input to the combiner 40.

The 125 KHz amplitude modulation of the audio carrier will hereinafter be referred to as the "reference subcarrier".

The output of the combiner thus comprises a 75% suppressed amplitude modulated video carrier at 61.25 MHz, a frequency modulated audio carrier at 65.75 MHz (which is additionally amplitude modulated with the 125 KHz reference subcarrier) and an unmodulated reference carrier at 60.25 MHz. These carriers constitute the encoded channel 3 television channel which is combined with other channels for distribution through the CATV system.

Figure 10:
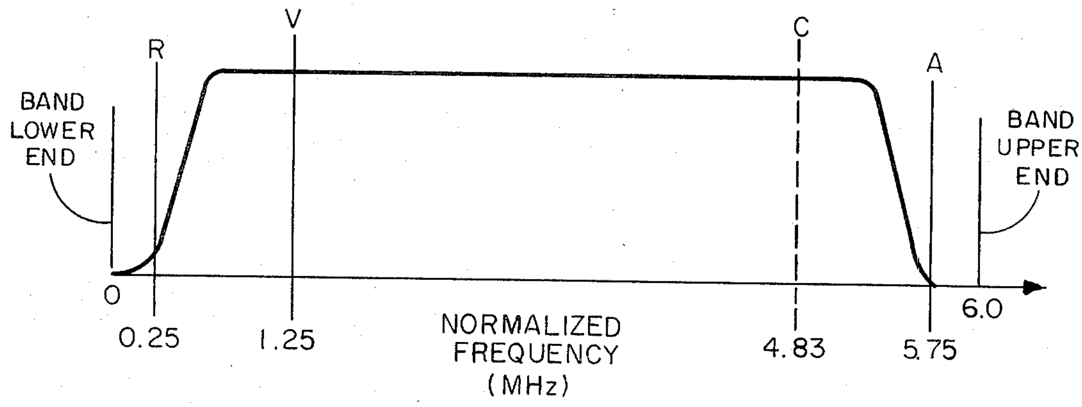
FIG. 10 illustrates the response of a frequency-normalized channel with the carriers of interest, namely a reference carrier, a video carrier, an audio carrier and a color subcarrier.

FIG. 10 illustrates a frequency-normalized channel with the three carriers of interest. R is the unmodulated reference carrier, which is at 0.25 MHz from the lower band end. V is the 75% suppressed video carrier at 1.25 MHz from the lower band end, while A is the compositely modulated audio carrier at 5.75 MHz. The color subcarrier C is also indicated at 4.83 MHz.

In CATV systems the audio carrier is generally transmitted at a level of −15 dB with respect to the peak sync video carrier. With the video carrier encoded by the use of 75% carrier suppression, amplitude is reduced from 100% to 25%, a reduction of 12 dB. The preferred audio carrier level in the encoded channel is thus −3 dB with respect to suppressed peak sync. This is also the preferred level of the reference carrier.

Referring back to FIG. 9, it will be appreciated that the freqeuncy separation between the video carrier at 61.25 MHz and the reference carrier at 60.25 MHz is dependent only upon the 1.0 MHz output from the crystal filter 50. The 1.0 MHz frequency is also developed as the eighth harmonic of the highly stable 125 KHz output from crystal oscillator 48. While the frequency of the oscillator 48 is very stable, nonetheless it will vary within the tolerance of the crystal and its phase will rotate as a function of this frequency variation. These phase and frequency variations will also be imparted to the 1.0 MHz frequency developed by the multiplier 49 upon which the intercarrier separation of the video and reference carriers depends. As an example, if the 125 KHz crystal frequency varies by say 2.0 Hz, then the 1.0 MHz frequency will vary by 8 × 2.0 = 16.0 Hz in the same direction. If the phase of the crystal frequency advances by one radian, then the phase of the 1.0 MHz frequency will advance by eight radians in the same direction. Thus, variations in the phase and frequency of the reference carrier with respect to the suppressed video carrier are present also on the reference subcarrier, however scaled down by a factor of eight. The interdependence in phase and frequency between the 1.0 MHz intercarrier reference and the 125 KHz reference subcarrier is of vital importance in the decoding of the encoded channel, as will be discussed subsequently.

It should be noted in passing that the choice of the 1.0 MHz intercarrier separation between the suppressed video carrier and the reference carrier is not to be construed as a limitation. Nor is the multiplication by eight to be construed as a limitation. Other intercarrier separations could well be employed as could other multipliers. What is important is the direct relationship, through multiplication, between the reference subcarrier frequency and the intercarrier separation between the suppressed video carrier and the reference carrier. In this manner, the precise phase reference of the video carrier, which is otherwise destroyed by virtue of it being suppressed, is conveyed to the decoder in the form of two separate but related pieces of information which may be transmitted within the encoded channel.

Figure 11:
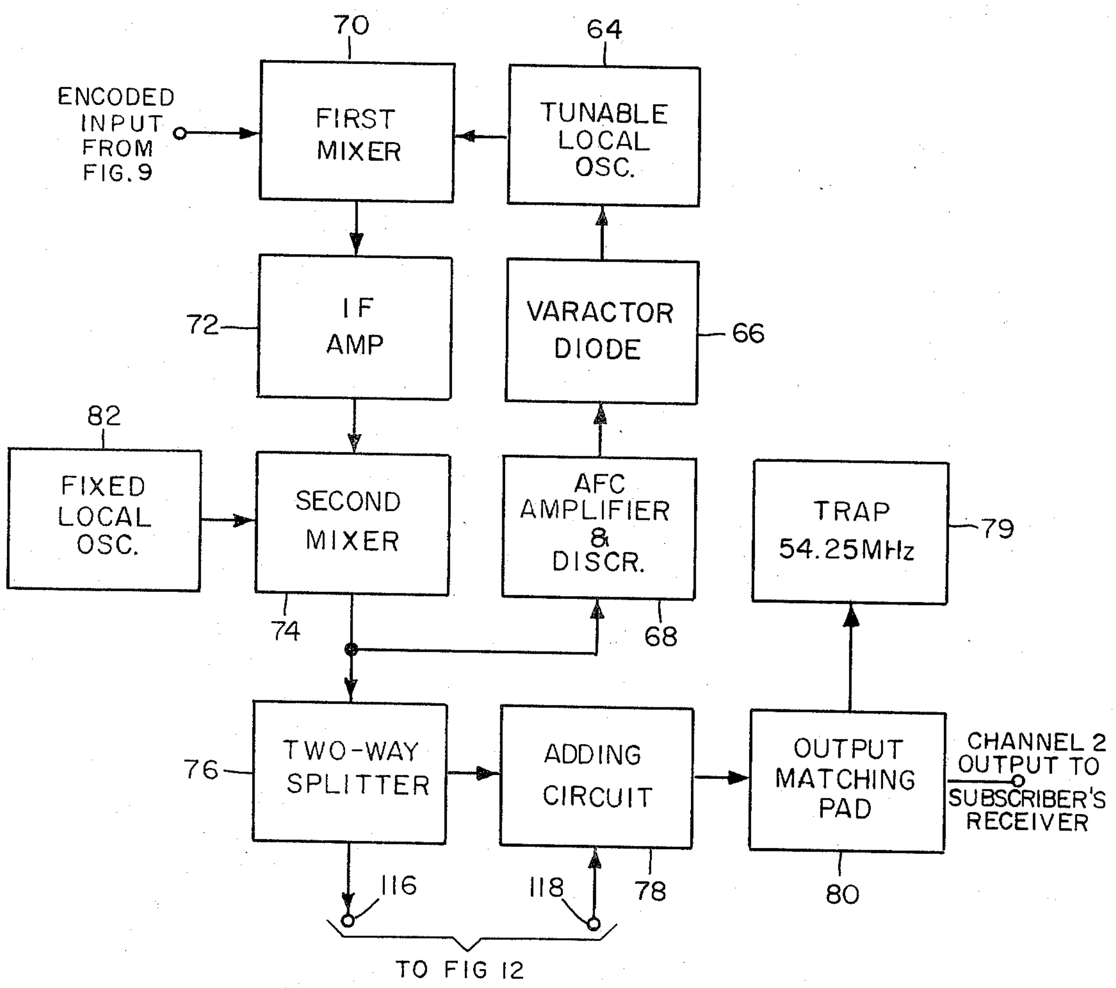
FIGS. 11 and 12 are block diagrams of a CATV converter and a decoder, respectively, which together form an attachment to a subscriber television receiver for decoding the signals from the encoder/modulator shown in FIG. 9.
Figure 12:
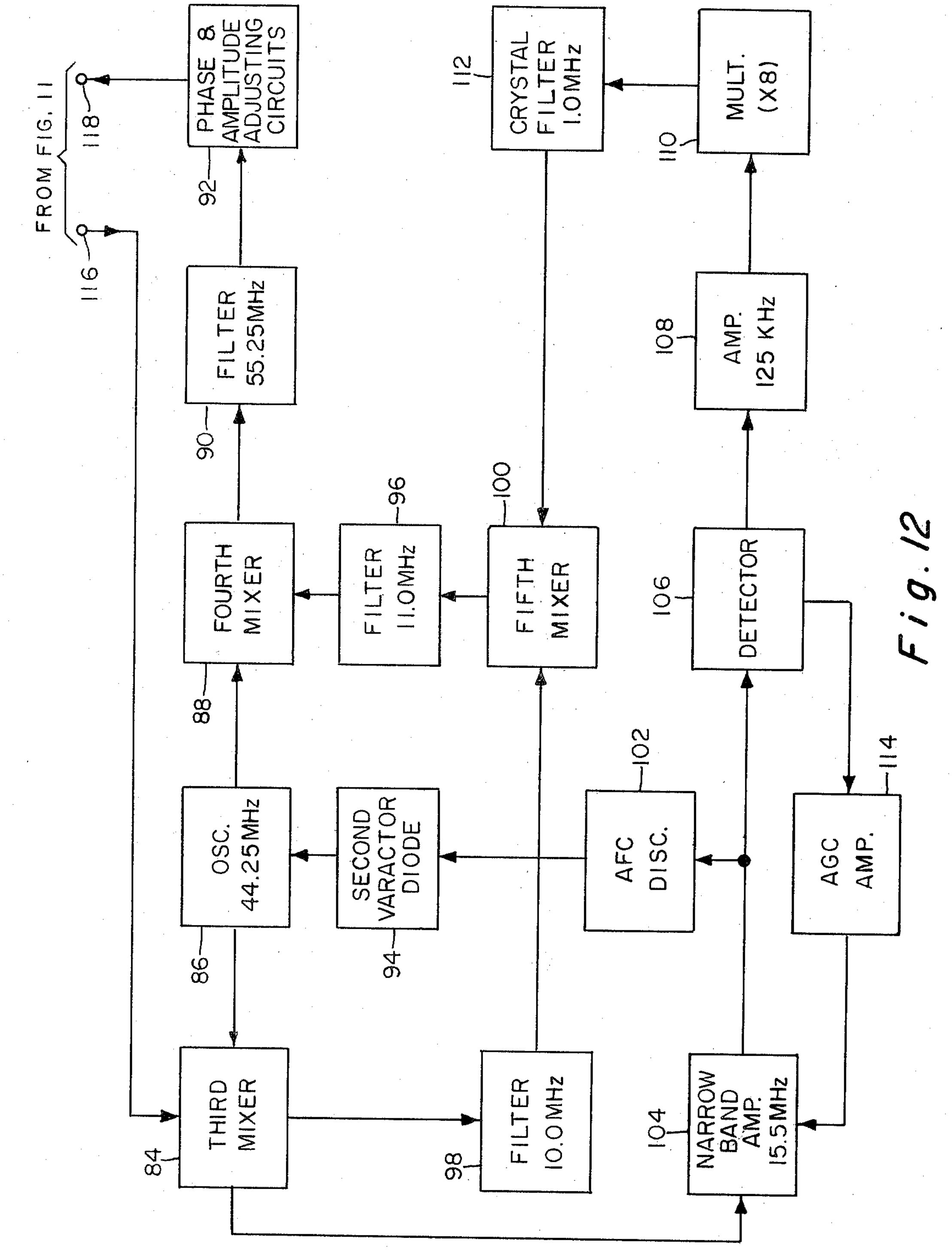

Attention is now directed to FIGS. 11 and 12 which together show a block diagram of a converter/decoder that forms an attachment to a subscriber television receiver. The decoder in FIG. 12 will decode television channels encoded by the encoder/modulator depicted in FIG. 9. Blocks 64 through 82 shown in FIG. 11 constitute the converter portion of the converter/decoder, including additional features which facilitate the interconnection of the decoder. Interconnection may be through the agency of two plugs and sockets indicated at 116 and 118. The decoder portion is comprised of blocks 84 through 114 shown in FIG. 12.

Referring to the converter portion of FIG. 11, the input cable from the CATV system is connected to a first mixer 70 which has a second input from a tunable local oscillator 64. That oscillator is generally a "high side" oscillator whose frequency can be varied so as to convert all incoming channels to a suitable intermediate frequency. The intermediate frequency is selected and amplified in IF amplifier 72 and applied to a second mixer 74 which also receives a signal from a fixed local oscillator 82. That oscillator is also a high-side oscillator and its frequency is such as to convert the IF to a standard VHF television channel, unoccupied by a local television station. By way of example, but not to be construed as a limitation, the converted channel is assumed to be channel 2. As both oscillators 64 and 82 are high side, the frequency inversion caused by the first mixer 70 is cancelled by that due to the second mixer 74. thus the output of the second mixer 74 is "erect", with the video at 55.25 MHz, the audio at 59.75 MHz and the reference carrier, if any, at 54.25 MHz.

Associated with the second mixer 74 is an AFC amplifier and discriminator 68 which, in conjunction with a first varactor diode 66, serves to stabilize the converted channel 2 output frequency. The AFC control voltage applied to the varactor 66 causes the frequency of the tunable local oscillator 64 to correct for errors both in its own frequency and that of the fixed oscillator 82. Thus if the combined tolerance of oscillators 64 and 82 is say ± 500 KHz, the AFC circuit may be expected to reduce this by a factor of ten, so that the accuracy of the carrier oututs from mixer 74 will be within ± 50 KHz. The AFC amplifier and discriminator 68 may have a center frequency corresponding to either the video carrier at 55.25 MHz or the audio carrier at 59.75 MHz.

The output from the second mixer 74 is applied to a two-way splitter 76, one output of which is coupled as a first input to an adding circuit 78. The output of adding circuit 78 is passed to an output matching pad 80, associated with which is a trap tuned to 54.25 MHz (the channel 2 reference carrier frequency). The output of pad 80 is connected to the antenna terminals of the subscriber TV receiver.

It is evident that the converter portion of the converter/decoder, as exemplified by blocks 64 through 82, will function as any normal CATV converter. Non-encoded channels will be selected and passed to the subscriber receiver un-modified. Furthermore, without the engagement of the decoder through the plugs and sockets 116 and 118, any channels that are encoded in accordance with this invention will yield no entertainment to the subscriber. The fact that the trap 79 removes the reference carrier at 54.25 MHz does not in any way compensate for the inverted jumbled picture and the loud 60 Hz buzz in the sound that are reproduced by his TV receiver. However, with the decoder engaged, as will now be described with reference to FIG. 12, the encoded transmissions will be fully decoded.

The second output of the two-way splitter 76 is passed, through the plug and socket 116 to a third mixer 84. This receives a second input from a 44.25 MHz oscillator 86 which is in turn controlled in frequency by a second varactor diode 94. All three carriers of the converted channel 2 output from splitter 76 are present at the first input to third mixer 84, but only two are of interest. The reference carrier at 54.25 MHz is converted to 54.25 − 44.25 = 10.0 MHz and is selected by a 10.0 MHz filter 98, before application as a first input to a fifth mixer 100. The audio carrier at 59.75 MHz is converted to 59.75 − 44.25 = 15.5 MHz and is selected and amplified in a 15.5 MHz narrow band amplifier 104. This amplifier drives a detector 106 which demodulates the 125 KHz reference subcarrier signal, to be selected by the 125 KHz amplifier 108. The detector 106 also furnishes a DC voltage which, through an AGC amplifier 114, serves to control the gain of amplifier 104 maintaining constant the 125.0 KHz output from detector 106.

The 125 KHz output from amplifier 108 is applied to a multiplier 110 with a multiplication ratio of eight. The output of the multiplier is thus a 1.0 MHz signal which is selected by a 1.0 MHz crystal filter 112 and passed to the fifth mixer 100 as a second input. The first input to the fifth mixer it will be recalled, is the unmodulated reference carrier output from the 10.0 MHz filter 98.

In the fifth mixer, the sum of the 10.0 MHz and 1.0 MHz inputs is developed and selected by an 11.0 MHz filter 96 for application to a fourth mixer 88. The second input to that mixer is a second output from the 44.25 MHz oscillator 86. In the fourth mixer the sum of the two input frequencies is of interest. This is an unmodulated carrier of frequency 44.25 + 11.0 = 55.25 MHz. It is selected by a filter 90 and applied to phase and amplitude adjusting circuits 92 before being further applied to the adding circuit 78 in FIG. 11 through the plug and socket 118.

The frequency of the video carrier of channel 2 is 55.25 MHz and is therefore the desired frequency of a carrier which may be combined with the 75% suppressed channel 2 video carrier input to the adding circuit 78 from the second mixer 74 via the two-way splitter 76 for purposes of restoring the suppressed carrier to normal, provided that it has precisely the same frequency as the suppressed carrier, and is adjusted to the appropriate amplitude and phase by means of the adjusting circuit 92. This is accomplished through simple additive mixing in adding circuit 78.

Restoration of the suppressed carrier represents the exact inverse process to that of suppression which occurred in the adding circuit 36 of the encoder modulator of FIG. 9. In this circuit the video carrier was suppressed by means of the addition of a steady carrier signal in exact phase opposition to that of the modulated video carrier, and with an amplitude exactly 75% of the peak sync carrier amplitude. In the adding circuit 78 of the converter/decoder of FIG. 11, the carrier is restored by applying a steady carrier which is exactly in phase with the suppressed carrier during the sync intervals, i.e., phase reference 0° as shown in FIGS. 6A and 6C, and 8A and 8C, and with an amplitude exactly three times greater than that existing during the suppressed sync intervals. A more detailed discussion of the manner in which this precise frequency, phase and amplitude relationship is accomplished will be presented subsequently.

The 15.5 MHz narrow band amplifier 104 in FIG. 12 also drives an AFC discriminator 102, the output voltage from which is applied to the second varactor diode 94. This serves to control the frequency of the 44.25 MHz oscillator 86, maintaining a very accurate center frequency of the 15.5 MHz audio carrier and, simultaneously, of the 10.0 MHz reference carrier. Both these signals, it will be recalled, form outputs from the third mixer 84. Because of the action of the AFC circuits in the converter, the frequency stability of the converted carrier inputs to the third mixer 84 is of the order of ±50 KHz. Because of the additional action of the second varactor diode 94 in coompensating the frequency of the 44.25 MHz oscillator 86, the expected stability of the 10.0 MHz reference carrier and 15.5 MHz audio carrier outputs from third mixer 84 is in the order of ±5 KHz.

The purpose behind achieving this high degree of stability is to eliminate any possibility of phase variations occurring in the relatively narrow band amplifier 104 and filters 98 and 96. These circuits may have a bandwidth in the order of ±250 KHz and it is desired to minimize the departure of the converted carriers too far from their respective passband center frequencies, thereby avoiding differential phase vs. frequency variations within the amplifier and filter tuned circuits.

Any frequency tolerance in the 44.25 MHz oscillator cancels in the down-conversion in the third mixer 84 and the up-conversion in the fourth mixer 88. If the 44.25 MHz oscillator has a positive frequency error of ΔF, this will be imparted to the 10 MHz and 15.5 MHz outputs from the third mixer 84. Thus $54.25 - (44.25 + \Delta F) = 10.0 - \Delta F$ MHz. In the fifth mixer 100, this signal is added to a 1.0 MHz frequency so its output is $(10.0 - \Delta F) + 1.0 = 11.0 - \Delta F$ MHz. In the fourth mixer 88, this is added to the oscillator frequency which is $(44.25 + \Delta F)$ MHz. Thus, $44.25 + \Delta F + (11.0 - \Delta F) = 55.25$ MHz and so the 55.25 MHz carrier output from fourth mixer 88 is related directly to the 54.25 MHz reference carrier input to third mixer 84 and separated from it by 1.0 MHz. The 1.0 MHz separation between these two carriers is of course the eighth multiple of the 125 KHz reference subcarrier derived by the detector 106 from the audio carrier.

Important to a full understanding of this invention is a clear analysis of the frequency, phase and amplitude relationships that exist between the various carriers and subscarriers, both in the encoder/modulator of FIG. 9 and the converter/decoder of FIGS. 11 and 12. In this analysis, set forth below, all frequencies are given in MHz, all relative phases are given in radians and time $t$ is given in seconds.

In FIG. 9, the video carrier output from the video carrier generator 32 may be defined as $$e_v = E_1 \sin 2\pi f_v t + \phi_1 \quad (2)$$

where
$E_1$ = peak value
$f_v$ = video carrier frequency
$\phi_1$ = initial phase In the video modulator 31, the expression in Equation 2 may also be used to define the modulated video carrier if $E_1$ is defined as the *peak sync* value. In the adding circuit 36, the video carrier is partially suppressed by the insertion of an antiphase carrier, derived from the phase inverter 33, with a peak amplitude 75% of the peak sync value of the video carrier. This antiphase carrier may be defined as $$e_s = -(0.75\, E_1 \sin 2\pi f_v t + \phi_1) \quad (3)$$

when $e_s$ is combined with $e_v$ in the adding circuit 36, the output of the adding circuit becomes $$e_v + e_s = e_{vs}$$
$$= E_1 \sin 2\pi f_v t + \phi_1 - (0.75\, E_1 \sin 2\pi f_v t + \phi_1)$$
$$e_{vs} = 0.25 E_1 \sin 2\pi f_v t + \phi_1 \quad (4)$$

This signal ultimately arrives at the adding circuit 78 in the converter portion in FIG. 11 and may be redefined as $$e_{vs} = 0.25 E_1 \sin 2\pi f_v t + \phi_1 + K_1 \quad (5)$$

where $K_1$ is a constant phase shift due to all preceding time delays due to circuits in both the encoder/-modulator and the converter portion of the converter/decoder.

In the encoder/modulator of FIG. 9, the reference subcarrier output from the 125 KHz oscillator 48 may be defined as $$e_{sc} = E_2 \sin 2\pi 0.125 t + \phi_2 \quad (6)$$

where
$E_2$ is the peak value
$\phi_2$ is the initial phase

This signal is multiplied by eight in multiplier 49 and its output may therefore be defined as $$e_m = E_3 \sin 2\pi 1.0 t + 8\phi_2 \quad (7)$$

This signal is subtracted from the video carrier, as defined in equation (2), in the second mixer 35 to form the reference carrier $e_r$. Thus $$e_r = e_v - e_m = E_1 \sin 2\pi f_v t + \phi - E_3 \sin 2\pi 1.0 t + 8\phi_2$$
$$= E_4 \sin 2\pi (f_v - 1.0) t + (\phi_1 - 8\phi_2) \quad (8)$$

where $E_4$ = peak value.

This signal ultimately arrives at the two-way splitter 76 of the converter portion of FIG. 11 and may be redefined as $$e_r = E_4 \sin 2\pi (f_v - 1.0) t + (\phi_1 - 8\phi_2) + K_2 \quad (9)$$

where $K_2$ is a constant phase shift due to all preceding time delays due to circuits in both the encoder/-modulator and the converter portion of the converter/decoder.

The reference subcarrier signal developed in the encoder/modulator, as defined in equation 6, is amplitude modulated upon the audio carrier in the amplitude modulator 47 in FIG. 9 and is ultimately demodulated in the detector 106 in FIG. 12 and selected by the 125 KHz amplifier 108. After multiplication by eight times in multiplier 110 and selection by the 1.0 MHz filter 112 the signal output from filter 112 is therefore that defined in equation 7, but may be redefined as $$e_m = E_3 \sin 2\pi 1.0 t + 8\phi_2 + K_3 \quad (10)$$

where $K_3$ is a constant phase shift due to all preceding time delays due to circuits both in the encoder/-modulator and the converter/decoder. This signal is applied to the fifth mixer 100.

The reference signal defined in equation 9 is applied in FIG. 12 to a third mixer 84 where it is mixed with the output of a 44.25 MHz oscillator 86. The oscillator signal may be defined as $$e_o = E_5 \sin 2\pi 44.25 t + \phi_3 \quad (11)$$

where
$E_5$ is the peak value
$\phi_3$ is the initial phase

The 10.0 MHz output of the mixer 84 then becomes the difference between $e_r$, as defined in equation 9 and $e_o$, defined in equation 11. Thus $$e_x = e_r - e_o$$
$$= E_4 \sin 2\pi (f_v - 1.0) t + (\phi_1 - 8\phi_2) + K_2 - [E_5 \sin 2\pi 44.25 t + \phi_3]$$
$$= E_6 \sin 2\pi (f_v - 1.0 - 44.25) t + \phi_1 - 8\phi_2 - \phi_3 + K_2 \quad (12)$$

This signal is combined in fifth mixer 100 with the 1.0 MHz signal defined in equation 10. The output of mixer 100 is the sum of these two signals and may be defined as $$e_y = e_m + e_x$$

$$=E_3 \sin 2\pi 1.0t + 8\phi_2 + K_3 + E_6 \sin 2\pi(f_v - 1.0 - 44.25)t + \phi_1 - 8\phi_2 - \phi_3 + K_2$$
$$= E_7 \sin 2\pi (f_v - 44.25)t + \phi_1 - \phi_3 + K_2 + K_3 \quad (13)$$

This signal is added in fourth mixer 88 to the 44.25 MHz oscillator signal defined in equation 11 and the mixer output becomes $$e_z = e_o + e_y$$
$$= E_5 \sin 2\pi 44.25t + \phi_3 + E_7 \sin 2\phi (f_v - 44.25)t + \phi_1 - \phi_3 + K_2 + K_3$$
$$= E_8 \sin 2\pi f_v t + \phi_1 + K_2 + K_3 \quad (14)$$

This signal is selected by 55.25 MHz filter 90 and applied to phase and amplitude adjusting circuits 92. At this point, $e_z$ may be redefined as $$e_z = E_8 \sin 2\pi f_v t + \phi_1 + K_4 \quad (15)$$

where $K_4$ is a constant phase shift comprising the sum of $K_2$ and $K_3$ plus any additional phase shift due to circuit time delays in the decoder.

The signal in equation 15 should be compared with that defined in equation 5, which is the suppressed video carrier signal passing through the adding circuit 78. It will be noted that it has the same frequency, but differs only in peak amplitude as represented by the difference between 0.25 $E_1$ and $E_8$ and relative phase as represented by the difference between $K_1$ and $K_4$. these differences are compensated by the phase and amplitude adjusting circuits 92 which adjust $E_8$ to equal 0.75 $E_1$ and adjust $K_4$ to equal $K_1$. This adjusted signal then becomes $$e_z = 0.75 E_1 \sin 2\pi f_v t + \phi_1 + K_1 \quad (16)$$

and is combined with the suppressed carrier signal in the adding circuit 78 to form a normally-modulated 55.25 MHz video carrier signal as depicted in FIGS. 6A and 8A thus $$e_v = e_{vs} + e_z$$
$$= 0.25\, E_1 \sin 2\pi f_v t + \phi_1 + K_1 + 0.75\, E_1 \sin 2\pi f_v t + \phi_1 + K_1$$
$$e_v = E_1 \sin 2\pi f_v t + \phi_1 + K_1 \quad (17)$$

This signal is passed to the subscriber receiver through the output matching pad 80 along with the 59.75 MHz audio carrier, which is of course also received as an output from second mixer 74 via two-way splitter 76. The 54.25 MHz trap 79 associated with the pad 80 removes the reference carrier at the output to the subscriber receiver which therefore now receives a completely decoded normal channel. The presence of the 125 KHz reference subcarrier amplitude modulation upon the frequency modulated audio carrier produces no audible effect in the reproduced sound nor does it have any adverse effect upon the reproduced picture. The depth of modulation of the 125 KHz subcarrier may be extremely small (i.e., in the order of 10%) in light of the very narrow bandwidth of the circuits which process this signal in the decoder. The bandwidth is in fact determined by the 1.0 MHz crystal filter 112. Signal-to-noise ratio is therefore not a problem, even with such a small modulation depth.

The importance of the two AFC circuits 68 and 102 will be appreciated when considering the equations given in the preceding discussion. Successful restoration of the suppressed video carrier depends upon preservation of the phase relationship between the suppressed video modulated carrier and the restoring carrier which are combined in the adding circuit 78. The relative difference between $K_1$ in equation 5 and $K_4$ in equation 15 must be maintained constant. If the carrier signals processed in the mixers and filters shown generally in blocks 84, 98, 100, 96 and 88 are allowed to drift too far within the bandwidth allotted to these circuits, the phenomenon of differential time delay will cause $K_4$ to be no longer a constant and the video carrier restoration will therefore no longer be perfect. In general, the overall bandwidth of these circuits will be in the order of ±250 KHz which is very compatible with the carrier accuracy of ±5 KHz which is obtained through use of the dual AFC system.

The processing of the audio carrier and reference carrier at the relatively low intermediate frequencies of 15.5 MHz and 10.0 MHz, respectively, allows for the use of highly selective circuits which eliminate spurious conversion products such as those due to the presence of the video carrier at the input to third mixer 84. Also the difference frequency output at 9.0 MHz from mixer 100 may be successfully rejected by the highly selective 11.0 MHz filter 96. By virtue of using these techniques, the 55.75 MHz carrier output from the filter 90 is uncontaminated by spurious signals which could cause interference when recombined with the suppressed video carrier in adding circuit 78.

Equally important as the control of the relative phases of the suppressed and restoring carriers in adding circuit 78 is the control of their relative amplitudes, regardless of the relative levels of the channel signals at the input to the converter/decoder. It will be noted that there is no AGC action in the converter portion of the converter/decoder as exemplified by blocks 64 through 82. Thus if, when switching from one channel to a second channel, the video carrier input is greater by say 3 dB, so that will both the audio and reference subcarriers be greater by 3 dB. These changes in amplitude will also exist at the output of the converter from the second mixer 74 through the two-way splitter 76, and the adding circuit 78. Consequently, the audio and reference carrier inputs to the third mixer 84 will be greater by 3 dB. The 44.25 MHz oscillator input to the third mixer 84 is by far the greater of the three signals and so the 10.0 MHz output will vary proportionally to the 54.25 MHz reference carrier input. Likewise, in the fifth mixer 100, the 1.0 MHz input is arranged to be the larger signal and in the fourth mixer 88 the 44.25 MHz oscillator input is arranged to be the larger signal. Consequently, the 3 dB increase is reflected throughout the processing chain, through the amplitude and phase adjusting circuits 92 to the adding circuit 78. Consequently, the amplitude of the 55.25 MHz restoring signal input to the adding circuit 78 varies in proportion to the 54.25 MHz reference carrier output from the two-way splitter 76 which is in turn proportional to the amplitude of the suppressed video carrier input to adding circuit 78. Therefore, variations in relative channel signal amplitudes at the input to the converter/decoder do not affect decoding, provided proper relative amplitudes between the suppressed video and reference carriers are maintained at different encoder/modulators.

The AGC amplifier 114 is important in maintaining constant the amplified 15.5 MHz audio carrier in detector 106 so that the 1.0 MHz input to fifth mixer 100 is always constant and greater than the 10.0 MHz input from filter 98.

The reference carrier is only 1.0 MHz from the video carrier and this relative proximity assures that in the broadband CATV distribution system, which spans many channels, there will be virtually no differential amplitude variations between the two carriers in the various amplifiers and passive circuits between the CATV head end and the most remote subscriber terminal.

It is evident from the preceding description and discussion that the first embodiment of the subject invention provides a secure and effective method and means for encoding and decoding a television channel through a single process and which satisfies all of the other requirements which were previously set forth.

Unlike the first embodiment, in which information pertaining to the video carrier phase is conveyed separately to the decoder in two parts, the second embodiment relys for decoding upon the fact that the phase of the 75% suppressed video carrier is undisturbed during the horizontal and vertical sync intervals. Means are provided at the encoder/modulator for generating keying pulse information which is conveyed to the decoder for purposes of regenerating a restoring carrier for restoring the suppressed video carrier to normal. Reference is again made to FIGS. 6A and 6C and, more particularly, to FIGS. 8A and 8C which respectively show the normally modulated video carrier and the 75% suppressed video carrier. In FIGS. 6A and 8A, the phase of the carrier wave was arbitrarily defined as 0°. It was also noted that the phase of the carrier remains at 0° during the horizontal sync pulse intervals, as well as during the pre-equalizing and post-equalizing pulse intervals. Additionally, the carrier phase is 0° during the pulse portions of the vertical sync interval and during the horizontal sync pulse portions of the post blanking interval. During the video intelligence portions of the composite waveform, the carrier phase is of course 180°, while during those portions of the waveform corresponding to blanking or black level, the carrier vanishes to zero. It is thus evident that, as the suppressed carrier phase is 0° during all the pulse portion of the synchronizing waveform, there is the prospect of gating out bursts of correctly phased carrier information at a 15.750 KHz rate, from which a restoring carrier may be regenerated. The second embodiment of this invention is based upon such a technique.

Figure 13:
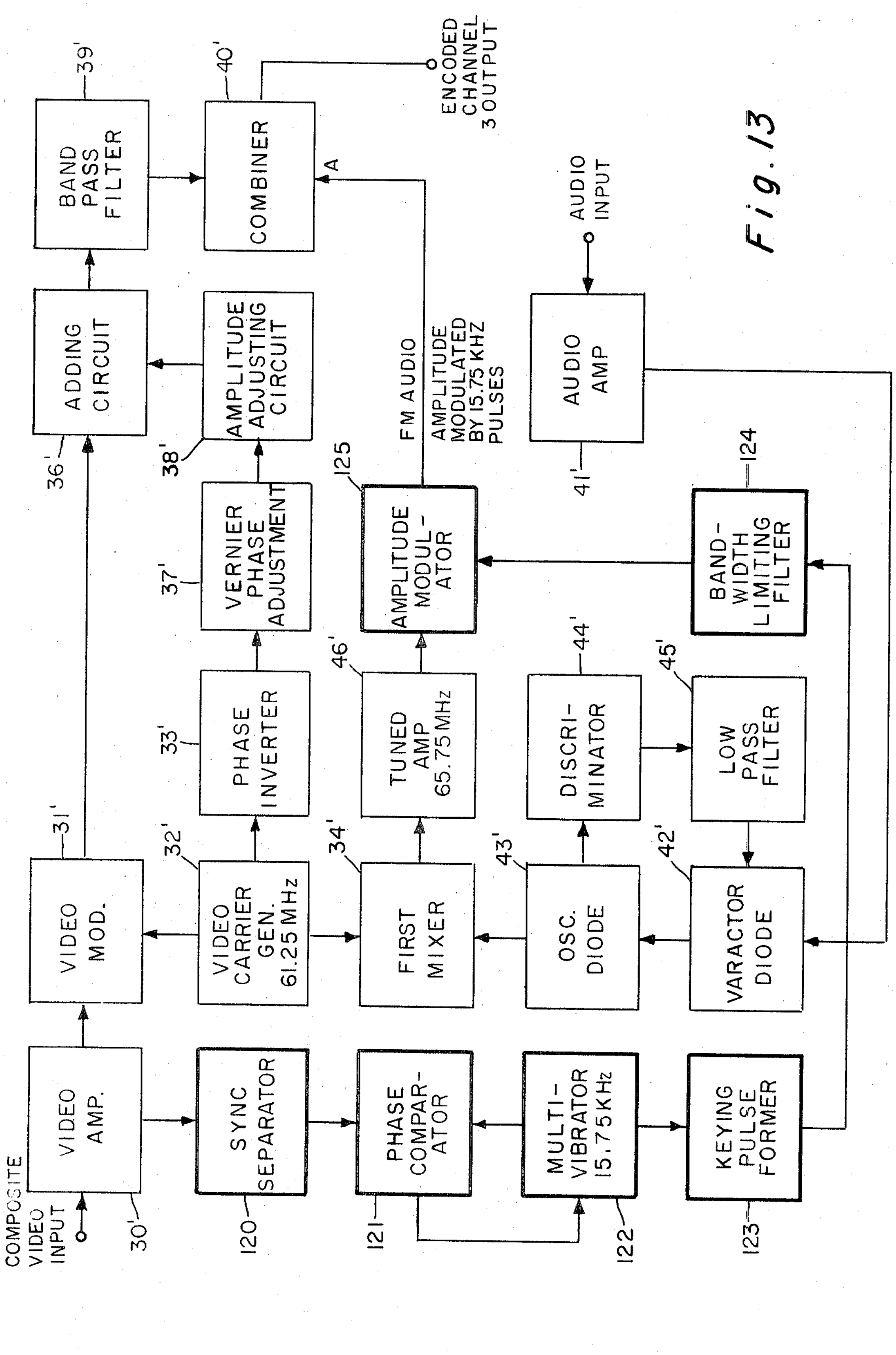
FIG. 13 is a block diagram of a second embodiment of the encoder/modulator.

Attention is now directed to FIG. 13 which shows a block diagram of an encoder/modulator in accordance with the second embodiment of this invention. The lightly outlined blocks identified by primed reference numerals correspond in every respect to their counterparts in the encoder/modulator of FIG. 9. Thus, blocks 30', 31', 32', 33', 36', 37', 38' and 39' serve to generate a 75% suppressed video carrier input to combiner 40' at a frequency of 61.25 MHz. This is the frequency of channel 3 video which is used as a representative example. A frequency modulated audio carrier at 65.75 MHz is developed as before by blocks 34', 41', 42', 43', 44', 45' and 46'. Of particular interest are the heavily outlined blocks 120 to 125 which do not have counterparts (or exact counterparts) in FIG. 9. Their functions will now be described in detail.

A second output from the video amplifier 30' drives a sync separator 120 which removes the synchronizing information from the composite video signal and applies it to a phase comparator 121. A second input to the phase comparator is the pulse output from a 15.750 KHz multivibrator 122 in phase synchronism with the horizontal syne intervals of the video waveform. Blocks 120, 121, and 122 are identical in function to the horizontal AFC circuit which is found in virtually every modern television receiver. The phase comparator 121 synchronizes a multivibrator 122 to produce local pulses in synchronism with the horizontal sync pulses.

A second output from multivibrator 122 drives a keying pulse former 123 which develops 15.750 KHz rectangular pulses with a width corresponding approximately to that of normal horizontal sync (i.e., a pulse width of approximately 5.0 $\mu$S.). The output from pulse former 123 is applied to a bandwidth limiting filter 124 which restricts the pulse bandwidth to approximately 250 KHz before application to an amplitude modulator 125 as a second input. The first input to the modulator is the frequency modulated audio carrier at 65.75 MHz, as in the embodiment of FIG. 9.

The output of modulator 125, which is combined with the suppressed video carrier from the filter 39' in the combiner 40' is thus a frequency modulated audio carrier at 65.75 MHz which is additionally amplitude modulated with 15.750 KHz pulses corresponding in phase and width to horizonal sync. A preferred detph of amplitude modulation for the pulse is approximately 50% and the modulation polarity is preferably negative so that 50% carrier amplitude corresponds to peak keying pulse.

The purpose of resricting the pulse bandwidth to 250 KHz in the filter 124 is to ensure that sidebands of the pulse modultion do not extend beyond the channel band end which is 0.25 MHz above the audio carrier. (In the case of channel 3 which is used as an example, the audio carrier is at 65.75 MHz and the channel band end is at 66.0 MHz.)

The encoded output of the combiner 40' thus comprises only two carriers, the 75% suppressed video carrier at 61.25 MHz and the compositely modulated audio carrier at 65.75 MHz. This output is combined with other channels at the head end of a CATV system for distribution to subscribers.

Figure 14:
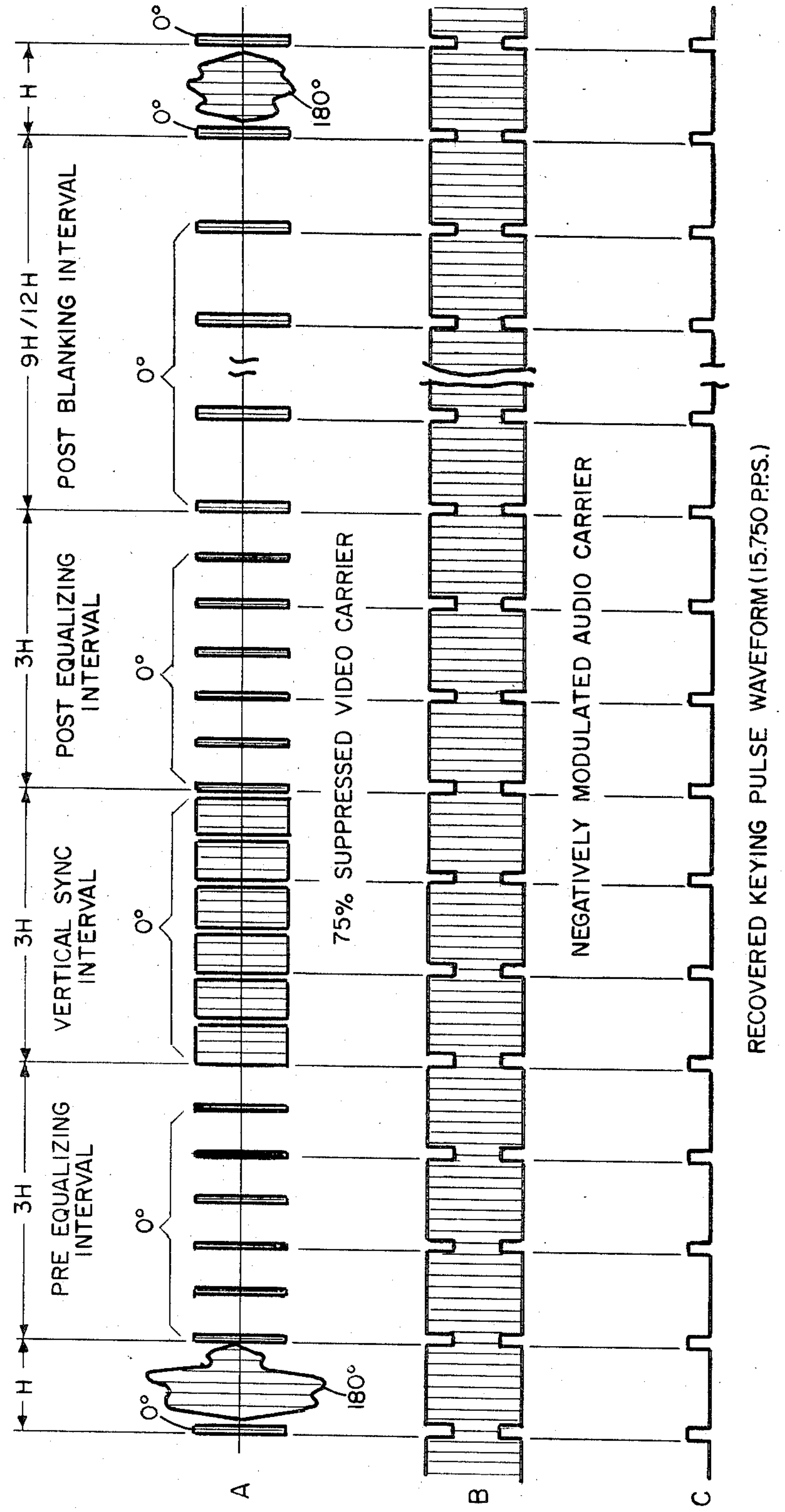
FIG. 14 illustrates waveforms useful in understanding the second embodiment of FIG. 13.

Waveforms A and B of FIG. 14 show, on a reduced scale, the respective 75 % suppressed video carrier and the 50% negatively modulated audio carrier during the 18 to 21H vertical retrace interval. These waveforms clearly show the desired phase relationships between the video modulation and the 15.750 KHz keying pulse modulation. During each of the keying pulse intervals a constant amplitude carrier with constant phase reference (arbitrarily designated 0°is always present in the suppressed video carrier waveform.

Figure 15:
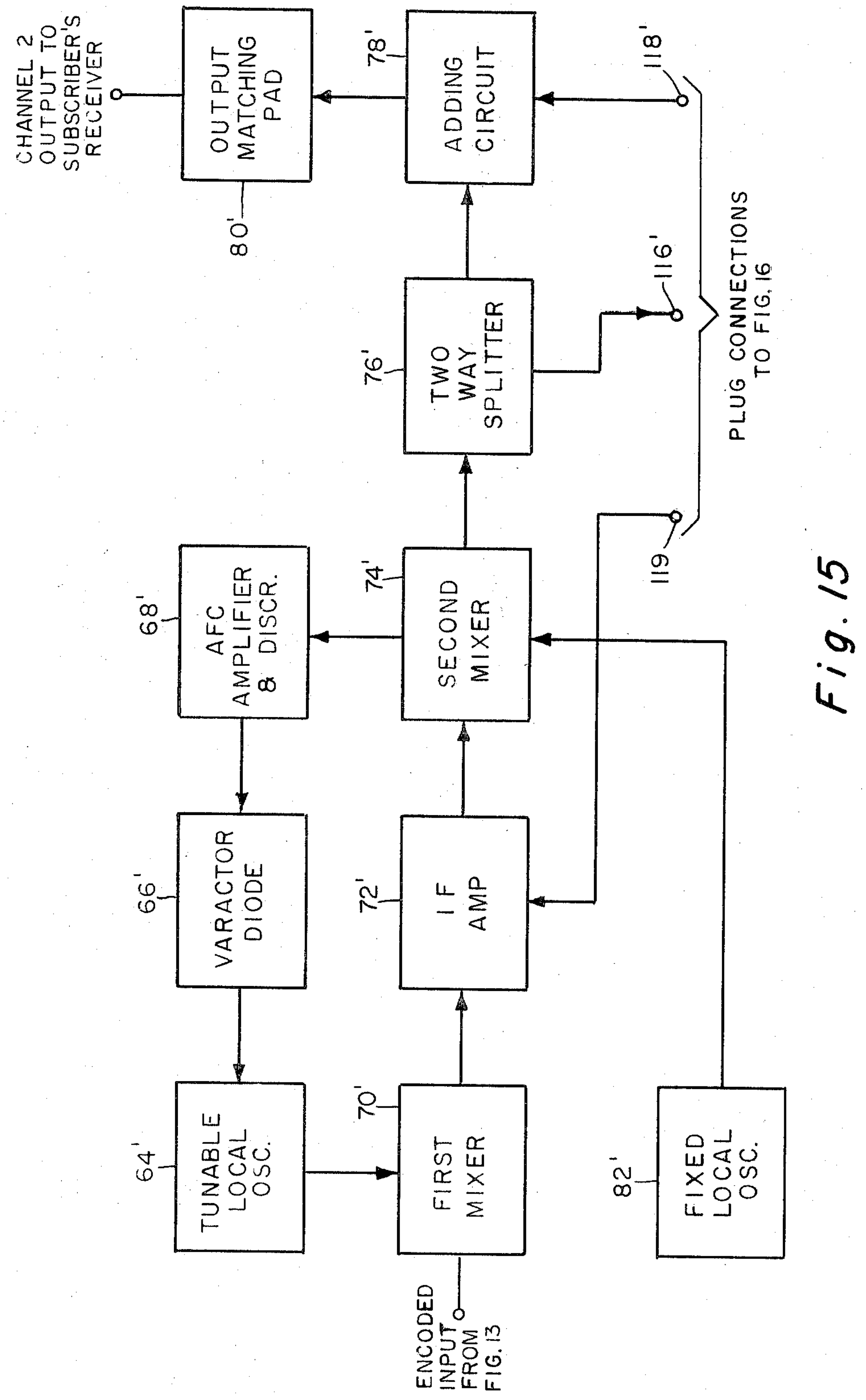
FIGS. 15 and 16 are respectively block diagrams of an alternative converter and decoder for receiving and decoding the signals from the encoder/modulator of FIG. 13.
Figure 16:
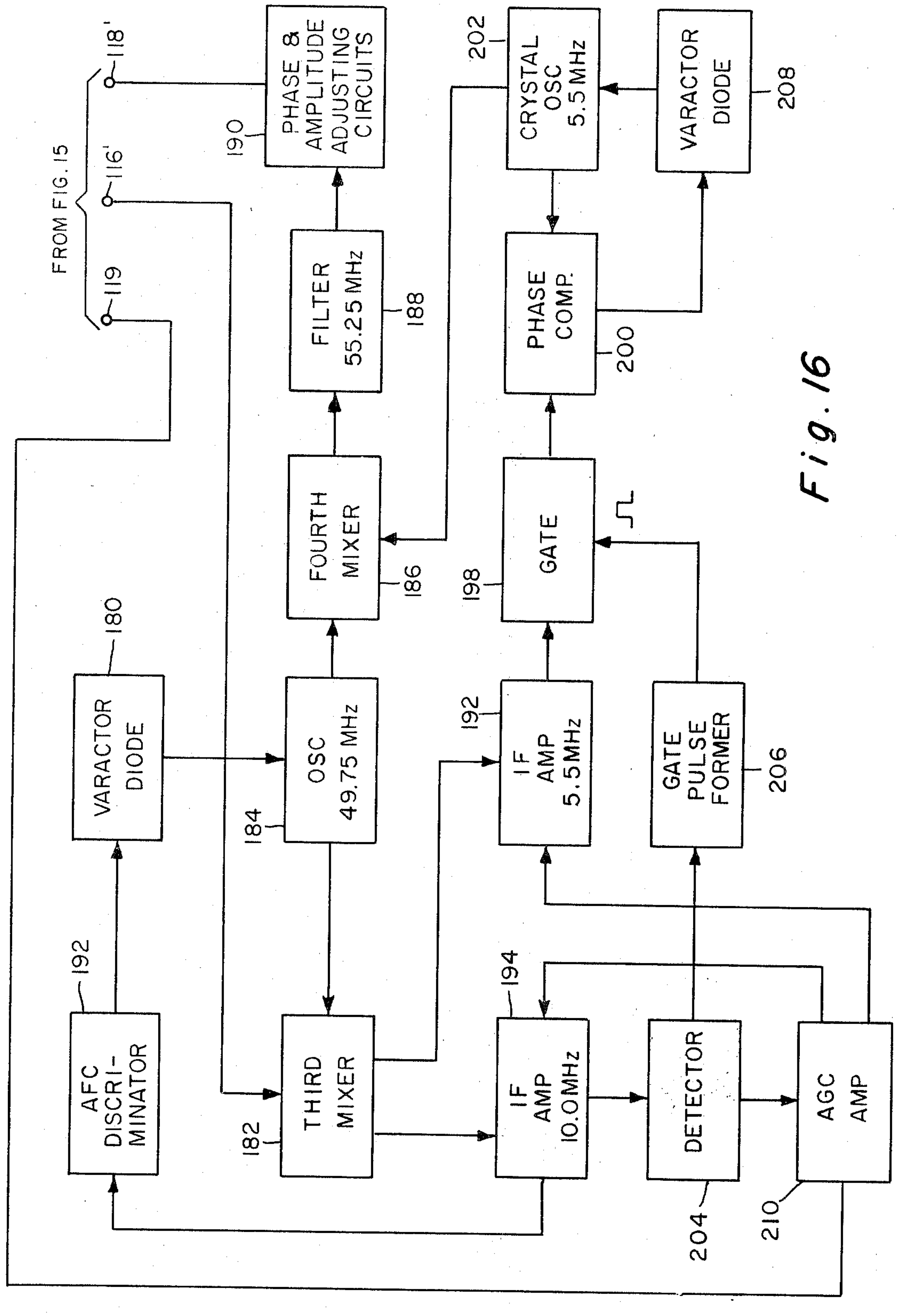

Reference is now made to FIGS. 15 and 16 which show a converter/decoder in accordance with the second embodiment of this invention Blocks in FIG. 15, which comprise the converter, are identified by primed reference numerals to indicate that they correspond directly to blocks in the first embodiment of FIG. 11. The only minor exception is that the IF amplifier 72' is designed to allow the application of an AGC signal through a plug and socket 119. The converter is connected to the decoder shown in FIG. 16 through plugs and sockets 116' and 118', as well as 119.

Beyond stating that all input channels at the first mixer 70' are converted to a suitable IF frequency and then to an unoccupied off-air channel at the output of the second mixer 74', little further explanation is necessary for the converter of FIG. 15. As before, the output channel as a representative example is assumed to be channel 2, with the video carrier at 55.25 MHz and the audio carrier at 59.75 MHz. No trap is required to be associated with the output matching pad 80', because no reference carrier is transmitted in this second embodiment of the invention. The output matching pad drives the subscriber TV receiver and, as previously, without the engagement of the decoder portion through plugs and sockets 116' and 118', the converter portion functions as a normal CATV converter. Standard transmissions are passed to the subscriber receiver unmodified. Encoded transmissions result in an inverted, jumbled picture and a distressing 60 Hz buzz in the sound without the decoder of FIG. 16.

The AFC circuitry comprising blocks 64', 66' and 68' serve, as previously, to maintain the accuracy of the carrier outputs from the second mixer 74' within approximately ±50 KHz.

The operation of the plug-in decoder, as represented by blocks 180 through 210 shown in FIG. 16, is markedly different to that of the decoder disclosed in FIG. 12. A second output is obtained from the two-way splitter 76' of the converter in FIG. 15 and comprises the 75% suppressed video carrier at 55.25 MHz as before and the audio carrier at 59.75 MHz, 50% negatively modulated by pulses at 15.750 KHz, synchronized in phase and width with sync pulses in the video carrier. The suppressed video carrier and the 50% modulated audio carrier are respectively illustrated in waveforms A and B of FIG. 14. These carriers form the first input to a third mixer 182 which is also driven by one of two outputs from a 49.75 MHz oscillator 184. At the output of the third mixer, the difference frequencies are of interest. The audio carrier is converted to 59.75 − 49.75 = 10.0 MHz and the suppressed video carrier is converted to 55.25 − 49.75 = 5.5 MHz. These carrier outputs from the third mixer are respectively selected and amplified by amplifiers 194 and 196 which are both highly selective and which have relatively high gain, and both of which are controllable by AGC.

The frequency of 49.75 MHz generated by the oscillator 184 and the consequent IF frequencies of 10.0 and 5.5 MHz are not to be construed as limitations. What is desired to be achieved are two relatively low IF frequencies which may be processed in amplifiers with high selectivity.

The 10.0 MHz amplifier 194 drives both a detector 204 and an AFC discriminator 192. The latter provides a control voltage to a varactor diode 180 associated with the 49.75 MHz oscilllator 184, which serves to maintain the accuracy of the oscillator within close tolerances. As a result, the center frequency accuracy of the 10.0 and 5.5 MHz IF carriers, already controlled by the converter AFC circuits (blocks 64', 66' and 68' of FIG. 15) within approximately ±50 KHz, is readily maintained within ±5 KHz or better.

The detector 204 recovers the 15.750 KHz keying pulse modulation from the 10.0 MHz audio IF carrier and applies this to a gate pulse former 206. The gate pulse former squares up the keying pulses which were deliberately bandwidth limited in the encoder of FIG. 13 (through the agency of the filter 124) and applies them as a first input to a gate 198. Waveform C of FIG. 14 shows the recovered keying pulses. The DC component of the output of detector 204 also drives an AGC amplifier 210 which provides AGC control voltages to the converter IF amplifier 72' in FIG. 15, the 10.0 MHz audio IF amplifier 194 and the 5.5 MHz video IF amplifier 196. The outputs from all these three amplifiers are thereby maintained essentially constant, regardless of the level of the channel inputs from the CATV system, applied to first mixer 70' in FIG. 15.

The output of 5.5 MHz IF amplifier 196 which comprises the suppressed video IF carrier depicted in waveform A of FIG. 14 is applied as a second input to gate 198. The output of gate 198 therefore comprises keyed bursts of the video carrier at the phase reference of 0°, previously defined, with a frequency of 5.5 MHz (or better). These carrier bursts are applied as a first input to a phase comparator 200, the second input to which is the output of a 5.5 MHz crystal oscillator 202 which has associated with it a varactor diode 208 that acts as variable capacitor is shunt with the crystal frequency-determining element, and which is responsive to the control voltage derived from the phase comparator 200. The phase comparator 200 and varactor diode 208 therefore serve to phase lock the crystal oscillator 202 to the burst outputs from gate 198 in much the same manner that the local 32.58 MHz color carrier oscillator is locked to the 3.58 MHz burst signal in every modern color television receiver.

The constant-amplitude, phase locked 5.5 MHz output from oscillator 202 is applied as a first input to a fourth mixer 186, the second input to which is a second output from 49.75 MHz oscillator 184. The sum frequency developed by mixer 186 is of interest, which is 5.5 + 49.75 = 55.25 MHz. This signal, which is an AGC controlled, unmodulated carrier, is selected by the 55.25 MHz filter 188 and applied to the phase and amplitude adjusting circuits 190. The 55.25 MHz frequency happens to be the desired frequency of a restoring carrier, which may be combined in adding circuit 78' of FIG. 15 with the 55.25 MHz suppresed video carrier which forms a second input (along with the 59.75 MHz audio carrier) to the adding circuit.

By virtue of the AGC action in controlling the gain of the IF amplifier 72' in FIG. 15, the amplitude of the 55.25 MHz suppressed video carrier (and of the associated audio carrier) is maintained substantially constant. So also is the amplitude of the 55.25 MHz restoring carrier output from the fourth mixer 186, by virtue of the fact that both inputs to mixer 186 are derived from constant-amplitude oscillators (49.75 MHz oscilllator 184 and 5.5 MHz oscillator 202).

All that is required, prior to injection of the 55.25 MHz carrier into the adding circuit 78' is that the amplitude of this restoring carrier be adjusted to three times that of the suppressed sync value of the video carrier and that the phase be adjusted to the 0° carrier reference phase. These adjustments are accomplished in circuits 190 and, as a consequence, the 55.25 MHz suppressed carrier signal passing through adding circuit 78' is restored to a nomral amplitude modulated channel 2 video carrier. The two carriers which therefore comprise the output of adding circuit 78' constitute a fully decoded television channel which is passed to the subscriber receiver through the matching pad 80'. The channel video and audio are perfectly reproduced by the receiver.

The presence of the 15.750 KHz keying pulse modulation on the audio carrier causes no audible effect in the reproduced audio as the FM audio system is inherently immune to AM disturbances. Furthermore, the 15.750 KHz signal is virtually beyond the audible range of frequencies. In addition, this modulation has no perceptible effect upon the video reproduction. Its sidebands do not extend into the video passband, and furthermore, they exist only during the horizontal retrace intervals. As far as the subscriber receiver is concerned, it is reproducing a completely normal transmission.

The AFC action in the decoder of FIG. 16 is very important in maintaining relatively high frequency stability of the 5.5 MHz and 10.0 MHz carriers. This eliminates differential time delay phenomena in the selective circuits which process these carriers and allows a constant phase relationship between the suppressed video and restoring carriers in the adding circuit 78' of FIG. 15. Also, frequency and phase variations in the 49.75 MHz oscillator 184 are cancelled in the two mixers 182 and 186 which are driven by this oscillator. Accordingly, the second embodiment of the subject invention also accomplishes the aims and objectives of the first embodiment, and satisfies the stipulated requirements for a practical encoding and decoding system for CATV.

It should be noted that the system described in the first embodiment does not depend upon the video carrier phase during the suppressed sync intervals as the restoring carrier phase information is transmitted independently. Thus, even 100% video carrier suppression may be used if desired. In the second embodiment however, 100% video carrier suppression is impracticable because, as will be noted from inspection of FIGS. 6D and 8D, no carrier exists at all during the suppressed sync intervals. No carrier phase information can therefore be derived by keying such a suppressed video carrier in gate 198 in FIG. 16. To this extent, therefore, the second embodiment is slightly less flexible than the first embodiment. However, as 75% carrier suppression is preferred for optimum audio encoding in either embodiment, both embodiments are equally practical and efficacious isn reality.

Although particular embodiments of the invention have been described and illustrated herein, it is recognized that modifications and equivalents may readily occur to those skilled in the art. For example, in the first embodiment of FIG. 9, the reference subcarrier at 125 KHz is transmitted to the receiver on the audio carrier, but it could be transmitted to the receiver on the reference carrier at 60.25 MHz, or on still another carrier. All that is required is simply that the reference carrier and reference subcarrier be transmitted for use by autorized receivers as the information required to restore the suppressed video carrier. It could even conceivably be done in another channel. Similarly, with respect to the second embodiment of FIG. 13, all that is required is for keying pulses to be transmitted for user by authorized receivers. They need not be transmitted on the audio carrier. They could, for example, be frequency modulated on another carrier on the opposite side of the band, or even on another channel. Still other forms and means of transmitting information necessary to restore the suppressed video carrier willl occur to those skilled in the art. Consequently, it is intended that the claims be interpreted to cover those and other modifications equivalents.

What is claimed is:

1. In a television communication system, a method of encoding a transmission to prevent a television program signal from being intelligibly received by an unauthorized television receiver, and for maintaining said television program signal recoverable by an authorized receiver, said television program signal being comprised of a video carrier amplitude modulated by a video signal, said television program signal being comprised of a video carrier amplitude modulated by a video signal, said modulated video carrier being combined with a frequency modulated audio carrier, said method being comprised of suppressing said modulated video carrier of said television program signal by a factor sufficient for at least portions of said modulated video carrier to be reduced below normal peak level at least part of the time, thus producing a suppressed video carrier whereby intelligible reception of said television program signal by an unauthorized receiver is prevented, wherein suppression of said modulated video carrier is sufficient during at least portions thereof to prevent satisfactory intercarrier demodulation of said frequency modulated audio carrier by an unauthorized receiver, whereby intelligible reception of the audio portion of said television program signal is prevented, and wherein suppression of said modulated vido carrier is to such an extent that proper line synchronization of an unauthorized receiver fails sufficiently for display of an intelligible picture to become impossible due to peak inverted video signals having an amplitude more than that of synchronizing pulses amplitude modulated on said video carrier.

2. The method as defined in claim 1 wherein suppression of said modulated video carrier is to such an extent that said synchronizing pulses have an amplitude insufficient to be detected by an unauthorized television receiver, whereby totally false and time-varying synchronizing information is derived from said modulated video carrier.

3. In a television communication system, a method a defined in claim 1 wherein information for use in restoring said moulated video carrier to its normal peak level in an authorized receiver is transmitted in the form of the interdependence in phase and frequency between a reference subcarrier and reference carrier, where said reference subcarrier is transmitted on a carrier and where said reference carrier is derived from said reference subcarrier and said video carrier as the frequency difference between said video carrier and the product of said reference subcarrier multiplied by a constant for a predetermined intercarrier frequency difference between said video carrier and said reference carrier to enable an authorized receiver to generate a local signal of proper frequency, phase and amplitude from the direct relationship, through multiplication, between the reference subcarrier frequency and the intercarrier difference frequency, said local signal to be added to said modulated video carrier received for restoration of the normal level of said modulated video carrier.

4. A method as defined in claim 3 wherein said authorized receiver restores said modulated video carrier to its normal peak level before normal receiver processing by continuously detecting said subcarrier reference, multiplying said detected subcarrier reference signal by said constant to produce a local product signal at the frequency of said intercarrier frequency, and effectively adding said local product signal to said reference carrier of said television program signal to produce a signal of the same frequency and phase as said video carrier of said television program signal for synchronizing a local signal generator in frequency and phase, and adding said local signal to said television program signal with just sufficient to restore said modulated video carrier.

5. A method as defined by claim 4 wherein said reference subcarrier is transmitted on a carrier within the same television channel as said video carrier.

6. A method as defined by claim 5 wherein said audio carrier is employed as the carrier for said reference subcarrier, and said reference subcarrier is amplitude modulated on said audio carrier.

7. A method as defined in claim 1 wherein suppression of said modulated video carrier is by a factor of 75% normal peak value, and wherein information for use in restoring said modulated video carrier in an authorized receiver is transmitted in the form of keying pulses synchronized with horizontal sync pulses in said modulated video carrier to enable an authorized receiver to detect said keying pulses and, in response thereto, gate bursts of modulated video carrier during horizontal sync periods to a local signal generator to synchronize said local signal generator in frequency and phase with said modulated video carrier received, whereby the output of said local signal generator may be added to said television program signal for restoration of said modulation video carrier at said authorized receiver.

8. A method as defined by claim 7 wherein said keying pulses are modulated on a carrier for transmission to said authorized receiver.

9. A method as defined by claim 8 wherein sid keying-pulse carrier is within the same television channel as said modulated video carrier.

10. A method as defined by claim 9 wherein said keying-pulse carrier is said audio carrier, and said keying pulses are amplitude modulated on said audio carrier.

11. The method of claim 3 wherein said information for use ijn restoring the suppressed video carrier in an authorized receiver is comprised of a reference subcarrier signal of substantially constant frequency and an unmodulated reference carrier derived from said reference subcarrier signal by multiplying said reference subcarrier signal by a fixed multiplier and mixing the product with unmodulated video carrier from said video carrier generator, and wherein said frequency modulated audio carrier is amplitude modulated by said reference subcarrier signal, the frequency of said reference subcarrier signal being selected to be sufficiently low so that modulation sidebands do not extend beyond the upper and lower band ends, whereby variations in the phase and frequency of said reference carrier with respect to said modulated video carrier due to any variation in phase of said reference subcarrier signal are present also in said modulated audio carrier, but scaled down by a factor equal to the multiplier used for deriving said reference carrier, thereby conveying a precise phase reference of said modulated video carrier for use in an authorized receiver for restoring said modulated video carrier to normal peak level.

12. The method of claim 11 wherein an authorized receiver decodes an encoded transmission by generating an unmodulated signal of predetermined amplitude at the frequency of said modulated video carrier in response to said reference subcarrier signal and said reference carrier, and adding said unmodulated signal to said encoded transmission being received, said predetermined amplitude being selected to just restore said modulated video carrier.

13. The method of claim 7 wherein said information for use in restoring the suppressed video carrier in an authorized receiver is comprised of keying pulses amplitude modulated on a carrier, said keying pulses being produced in response to detection of horizontal synchronizing pulses in the video signal.

14. The method of claim 13 wherein an authorized receiver produces a local signal synchronized in frequency and phase with said modulated video carrier by detecting keying pulses in said keying-pulse carrier and in response thereto gating a burst of suppressed video carrier cycles for use in synchronizing said local signal in frequency and phase with said modulated video carrier.

15. A method as defined in claim 1 wherein said factor is sufficient for amplitude modulation of the video intelligence of said modulated video carrier to become at least partially inverted in phase, thereby distorting the video intelligence envelope of said modulated video carrier.

16. In a television communication system, a method of encoding a transmission to prevent a television program signal from being intelligibly received by an unauthorized television receiver, and for maintaining said television program signal recoverable by an authorized receiver, said television program signal being comprised of a video carrier amplitude modulated by a video signal, said modulated video carrier being combined with a frequency modulated audio carrier, said method being comprised of suppressing said modulated video carrier of said television program signal by a factor sufficient for at least portions of said modulated video carrier to be reduced below normal peak level at least part of the time, thus producing a suppressed video carrier whereby intelligible reception of said television program signal by an unauthorized receiver is prevented, whereby suppression of said modulated video carrier is achieved by generating a carrier, phase inverting said carrier in a separate circuit from that used for amplitude modulation of said video carrier by a video signal to achieve said amplitude modulated video carrier, and adding a predetermined percentage of the inverted carrier to said amplitude modulated video carrier with the phase of said inverted video carrier adjusted to be 180° out of phase with said modulated video carrrier and the amplitude of said inverted video carrier.

17. The method of claim 16 in a television transmission system employing a receiver which relys upon intercarrier demodulation between the modulated video carrier and the modulated audio carrier to develop an audio signal, wherein said percentage of modulated video carrier suppression is sufficient for the modulated video carrier to be less than 12.5% a significant period of time during each vertical synchronizing cycle, thereby periodically disturbing audio reception by an unauthorized receiver at a rate equal to the vertical synchronizing frequency to produce an audible buzz out of said unauthorized receiver.

18. The method of claim 17, wherein said percentage of modulated video carrier suppression is 75%.

19. In a television communication system, apparatus for encoding a transmission to prevent a television program signal from being intelligibly received by an unauthorized receiver, and for maintaining said television program signal recoverable by an unauthorized receiver, said television program signal being comprised of an amplitude modulated video carrier combined with a frequency modulated audio carrier, the combination comprising means for generating a video carrier signal of constant frequency and amplitude, means for amplitude modulating said video carrier signal by a video signal to produce said modulated video carrier, means for suppressing said modulated video carrier by a factor to produce a suppressed video carrier, said factor being sufficient for amplitude modulation of the video intelligence of said video carrier to be reduced below normal peak level at least part of the time, whereby intelligible reception of said television program signal by an unauthorized receiver is prevented, and means for transmitting to all receivers of said system information for use by authorized receivers only to restore said modulated video carrier as received to a level it would have had if not suppressed before transmission.

20. Apparatus as defined in claim 19 wherein said factor is sufficient for amplitude modulation of the video intelligence of said modulated video carrier to become at least partially inverted in phase, thereby distorting the video intelligence envelope of said modulated carrier.

21. Apparatus as defined in claim 19 wherein said factor is sufficient to suppress said modulated video carrier to an extent that proper line synchronization at an unauthorized receiver fails sufficiently for display of an intelligible picture to be impossible due to peak inverted video signal portions having an amplitude more than that of synchronizing pulses amplitude modulated on said video carrier signal.

22. Apparatus as defined in claim 19 wherein said factor is sufficient for suppression of said modulated video carrier to an extent that line synchronization at an unauthorized receiver is impossible due to peak inverted video signal portions having an amplitude more than that of synchronizing pulses amplitude modulated on said video carrier signal, and said synchronizing pulses have an amplitude insufficient to be detected by a television receiver, whereby totally false and time-varying information is derived from said suppressed video carrier.

23. Apparatus as defined in claim 19 wherein said factor is sufficient for suppression of said modulated video carrier in the range of about 50 to 100% of normal peak value.

24. Apparatus as defined in claim 19 wherein said factor is sufficient to suppress said modulated video carrier 75% of normal peak value.

25. Apparatus as defined in claim 19 wherein said means for transmitting information for use by authorized receivers to restore said suppressed video carrier to full peak level before normal processing comprises means for generating a reference subcarrier at a constant frequency, means for transmitting said reference subcarrier to all receivers receiving said suppressed video carrier, means for multiplying said reference subcarrier by a predetermined factor sufficient to produce an intermediate signal having a frequency which differs from the frequency of said video carrier signal by a predetermined amount, means for producing a reference carrier at a frequency equal to the difference between said intermediate signal and said video carrier signal, and means for transmitting said reference carrier to all receivers receiving said suppressed video carrier.

26. Apparatus as defined in claim 25 wherein said means for transmitting said reference subcarrier to all said receivers comprises a carrier.

27. Apparatus as defined in claim 25 wherein said means for transmitting said reference subcarrier to all said receivers comprises said audio carrier, and means for amplitude modulating said carrier with said reference subcarrier.

28. Apparatus as defined in claim 25 wherein an authorized receiver includes means for restoring said suppressed video carrier to full peak level before normal processing, said restoring means comprising means for continuously detecting said subcarrier reference, means for multiplying said detected subcarrier reference by said predetermined factor to produce a local intermediate signal of a frequency equal to the frequency of said intermediate signal employed to produce said reference carrier, means responsive to said reference carrier for producing a local carrier reference of a frequency which, when added to said local intermediate signal, is of the same frequency as said video carrier of said television program signal received, and converted as required whenever the received television program signal is being converted from one channel to another, means for adding said local reference carrier to said local intermediate signal to produce a local video carrier of the same frequency and phase as said suppressed video carrier converted as required, means for adjusting the amplitude of said local video carrier to restore said suppressed video carrier to its full peak level when added to said suppressed video carrier converted as required, and means for adding said amplitude adjusted local video carrier to said suppressed video carrier converted as required.

29. Apparatus as defined in claim 24 wherein said means for transmitting information for use by authorized receivers to restore said suppressed modulated video carrier to full peak level before normal processing comprises means for producing keying pulses synchronized with horizontal sync pulses in said video carrier, means for transmitting said keying pulses to all receivers receiving said suppressed video carrier, means at an authorized receiver for detecting said keying pulses and, in response to each keying pulse detected, for producing a gating pulse, means at said receiver for generating a local signal at a frequency of said suppressed video carrier converted as required whenever the received television program signal is being converted from one channel to another, means responsive to each gating pulse for gating a burst of said suppressed video carrier received, and converted as required, to said local signal generating means to synchronize the phase and frequency of said local signal with said suppressed video carrier received, and converted as required, means for adjusting the amplitude of said local signal to be sufficient to just restore said suppressed video carrier to its full peak level, and means for adding said amplitude adjusted local signal to said suppressed video carrier received, and converted as required.

30. Apparatus as defined by claim 29 wherein said means for transmitting said keying pulses comprises a carrier.

31. Apparatus as defined by claim 30 wherein said keying-pulse carrier is within the same television channel band as said video carrier.

32. Apparatus as defined in claim 30 wherein said keying-pulse carrier is said audio carrier, and said means for transmitting said keying pulses includes means for amplitude modulating said audio carrier with said keying pulses.

* * * * *